United States Patent [19]
Suzuki et al.

[11] Patent Number: 5,936,223
[45] Date of Patent: Aug. 10, 1999

[54] ORIGINAL READER APPARATUS WHICH READS AN ORIGINAL IMAGE WHILE THE ORIGINAL PASSES OVER A READING POSITION

[75] Inventors: Katsunari Suzuki, Kawasaki; Ryosuke Miyamoto, Urayasu; Hideaki Shimizu, Yokohama; Hiroyoshi Yoshida, Fujisawa; Masao Watanabe, Kawasaki; Hiroyuki Yaguchi, Inagi; Yasuhiro Takiyama, Kawasaki; Tadashi Takahashi, Yokohama, all of Japan

[73] Assignee: Canon Kabushiki Kaisha, Tokyo, Japan

[21] Appl. No.: 08/834,845

[22] Filed: Apr. 10, 1997

[30] Foreign Application Priority Data

Apr. 15, 1996 [JP] Japan .................................. 8-115281

[51] Int. Cl.$^6$ ...................................................... G06K 7/10
[52] U.S. Cl. ...................................... 235/462.01; 235/432
[58] Field of Search ................................... 235/462, 472, 235/456, 375, 380, 382, 432

[56] References Cited

FOREIGN PATENT DOCUMENTS

| 0292263 | 12/1986 | Japan | 235/380 |
|---|---|---|---|
| 404123189 | 4/1992 | Japan | 235/380 |
| 2098775 | 11/1982 | United Kingdom | 235/384 |

Primary Examiner—Thien Minh Le
Attorney, Agent, or Firm—Fitzpatrick, Cella, Harper & Scinto

[57] ABSTRACT

An original document reading apparatus includes a first control portion for performing a first control wherein documents are transported at a first document interval in the event that a detected occupying capacity is less than a detected unused capacity. The first control portion also performs a second control wherein documents are transported at a second document interval which is greater than the first document interval in the event that the detected occupying capacity exceeds the detected unused capacity. A second control portion continuously activates an exposure portion under the first control, and intermittently activates the exposure portion under the second control.

11 Claims, 30 Drawing Sheets

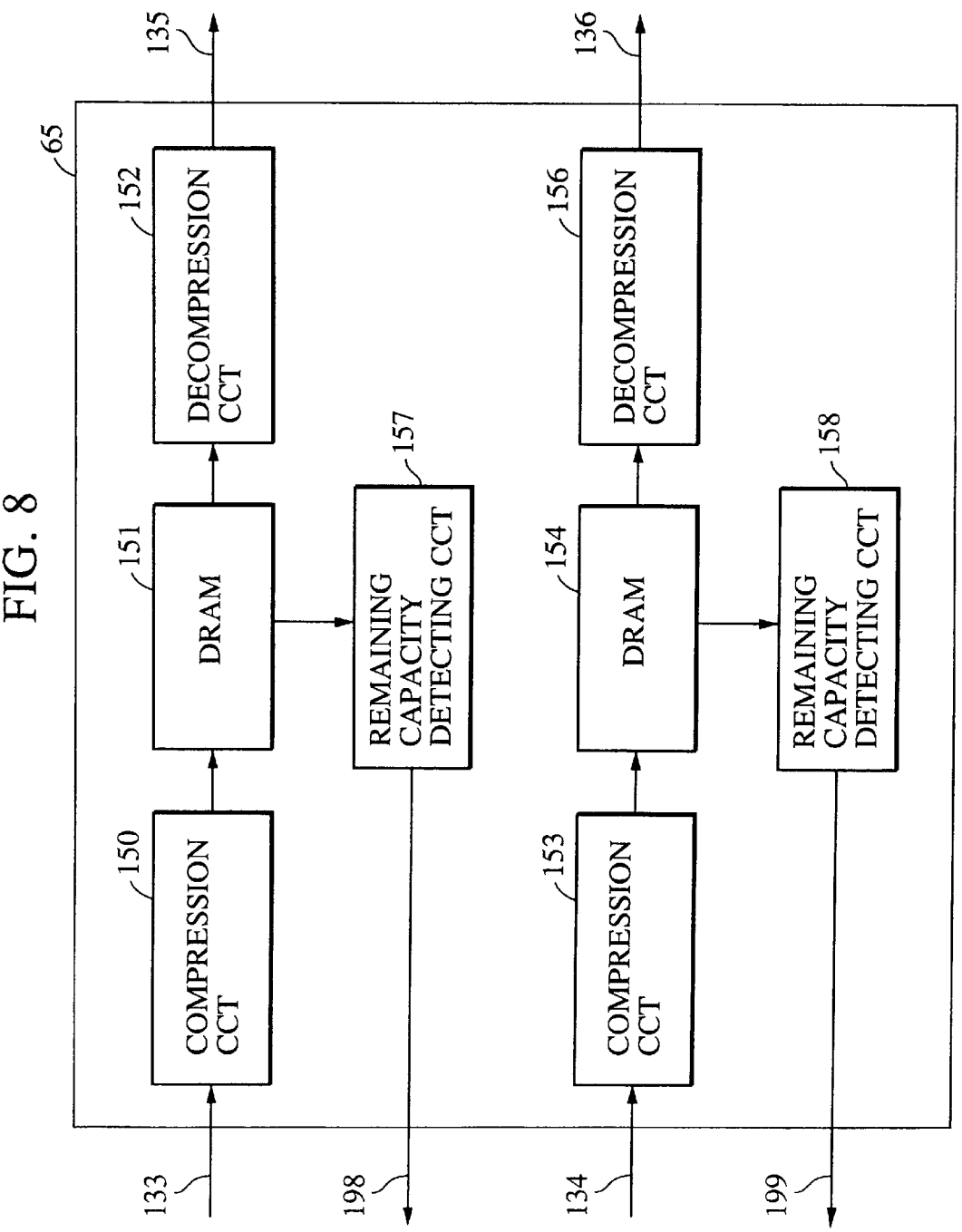

ORIGINAL READER APPARATUS WHICH READS AN ORIGINAL IMAGE WHILE THE ORIGINAL PASSES OVER A READING POSITION

BACKGROUND OF THE INVENTION

1. Field of the Invention

The present invention relates to an original reader apparatus which reads an original image while the original passes over a reading position, and stores image data corresponding to this reading in storing means.

2. Description of the Related Art

Sorting in known photocopiers has been performed by causing the original document to be passed through repeated cycling for photocopying onto output paper, which has been a cause of damage to the original document.

In order to deal with such a situation, an electronic sorter has been proposed. Such an electronic sorter uses memory which accumulates image data. Such memory has used either a low-speed large-capacity hard disk or a high-speed low-capacity semiconductor memory, wherein limitations in accumulation speed or accumulation capacity caused long periods of waiting for the image to be input, or input thereof being disabled for long periods of time. Also, various types of job scheduling have been proposed, wherein users bringing original documents to the digital photocopier proper would be given priority. However, in accordance with the present large-capacity photocopying area and large-volume outputting from PCs, spontaneous response and improvement in processing speed is being required.

This improvement in spontaneous response and improvement in processing speed is being dealt with by means of using large-capacity semiconductor memory. However, there are limitations to the accumulation capacity of such large-capacity semiconductor memory, and control of the equipment at this accumulation capacity limit has been problematic.

Also, in the event that such an accumulation capacity limitation occurs, continuous reading of original documents becomes impossible, so there is the necessity to have intervals between reading of the original documents. However, leaving the original exposure lamp on not only wastes electricity, but with original reading apparatuses arranged such that the original documents are fed and read at high speeds, the temperature in the immediate vicinity of the lamp fixed for passing documents over and reading suddenly rises, and this has been problematic from the point of overheating prevention, as well.

SUMMARY OF THE INVENTION

Accordingly, it is an object of the present invention to provide an original reader apparatus which solves the above problems.

It is another object of the present invention to provide an original reader apparatus which prevents overheating at the reading position.

Further objects and characteristics of the present invention will become apparent from the following specification and drawings.

BRIEF DESCRIPTION OF THE DRAWINGS

FIG. 8 is a block diagram illustrating the construction of the print buffer memory (PBM) of the image processing apparatus illustrated in FIG. 1;

DESCRIPTION OF THE PREFERRED EMBODIMENT

Figure 1:
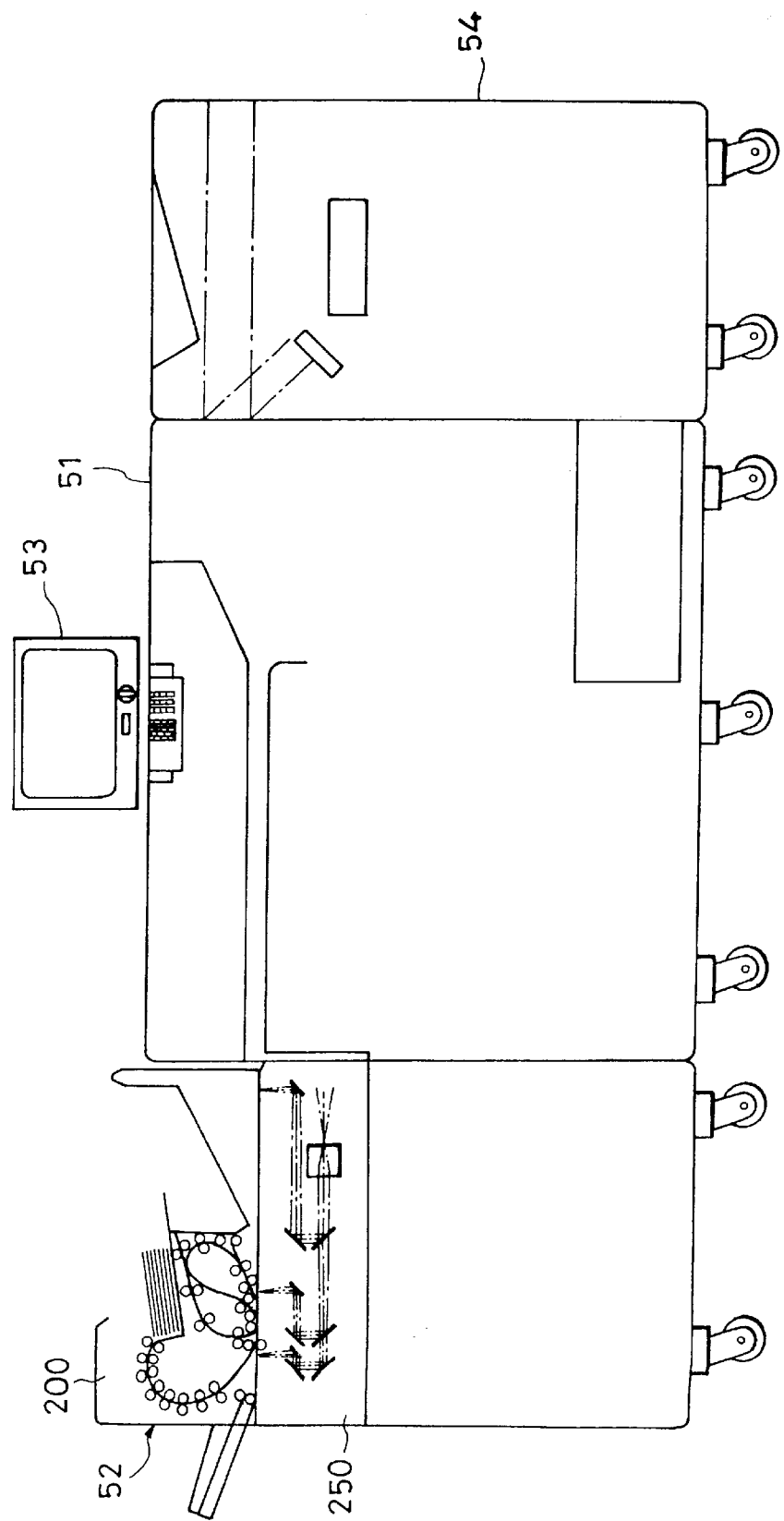
FIG. 1 is a side view illustrating a schematic construction of an image processing apparatus according to a first embodiment of the present invention.

This embodiment of the present invention is now explained with reference to the drawings. FIG. 1 shows a side view of a construction of an image processing apparatus (copying machine) of the present embodiment. In FIG. 1, numeral 51 denotes an image recording unit (hereinafter referred to as a printer unit), numeral 52 denotes an image read unit (hereinafter referred to as a reader unit), numeral 53 denotes a control unit (hereinafter referred to as an operator control unit (OCU)) and numeral 54 denotes a finishing unit.

The reader unit 52 comprises an automatic document sheet feeder unit (hereinafter referred to as an ADF) 200 for automatically feeding the document sheet to a read position and a scanner unit 250 for optically reading the document sheet image. A specific operation of the reader unit 52 will be explained with reference to FIG. 2. The printer unit 51 visualizes the image read by the reader unit 52 or the image sent from a computer terminal or an external equipment (not shown) such as a facsimile machine to print on a record sheet such as a transfer sheet. The printer unit 51 is provided with a large capacity print buffer memory (hereinafter referred to as a PBM) 65 as shown in FIG. 8 to store the image inputted from the ADF 200 or the external equipment and conduct the sorting process such as the rearrangement of pages after the storing. A specific operation of the printer unit 51 will also be described later.

The OCU 53 comprises a display and a keyboard (or a touch panel type display) to enter various settings by a user such as number of sheets setting, number of sets setting, edition of image and processing of image and display information representing the selected mode and status of the apparatus. The finishing unit 54 post-processes the output sheet obtained by having recorded on the record medium in the printer unit 51 and conducts the sorting, stapling or bookbinding.

A basic operation in the image processing apparatus of the configuration shown in FIG. 1 is now explained. When the user sets a plurality of document sheets on the ADF 200 of the reader unit 5, sets the mode of the OCU 53 and designates the start of copying, the ADF 200 feeds the document sheets one by one and the images thereof are read by the scanner unit 250. The scanner unit 250 photo-electrically converts the reflected light 110 from the exposed document sheet by a CCD line sensor 111 (see FIG. 2) to read it as an electrical signal. The read image signal is processed in various manners by an image processing unit 61 to be described later and it is compressed and transferred to the PBM 65 of the printer unit 51. The printer unit 51 sequentially reads the images from the PBM 65 in accordance with the user setting from the OCU 53 and the read image is converted to an optical signal for the exposure of the photo-conductor.

Then, the conventional electro-photographic processes. that is, charging, exposing, Latent image forming, developing, transferring, separation and fixing are conducted and the image is recorded on the record medium.

The basic operation in the image processing apparatus of FIG. 1 has thus been described.

Figure 2:
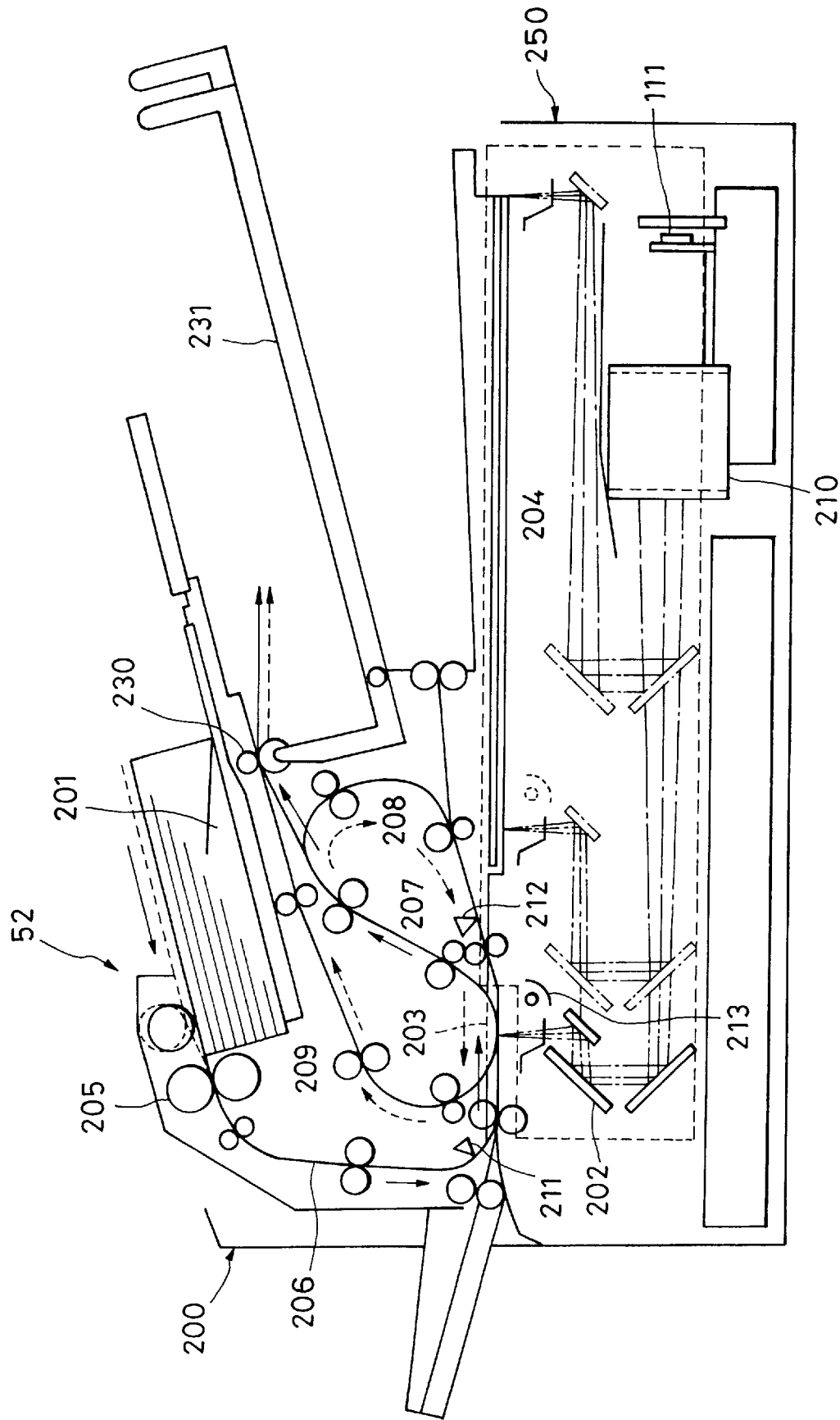
FIG. 2 is a longitudinal cross-sectional view illustrating the construction of an automatic document feeder device for the image processing apparatus.
Figure 3A:
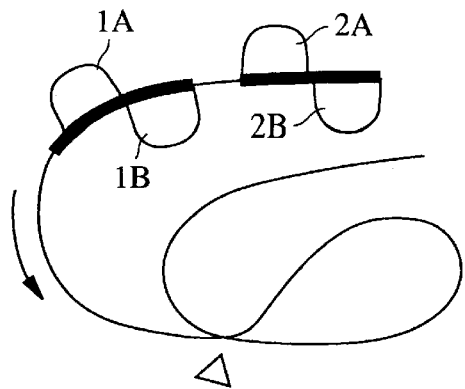
FIG. 3A–3F constitute an explanatory diagram of the document feeding operation of the automatic document feeder device.
Figure 3B:
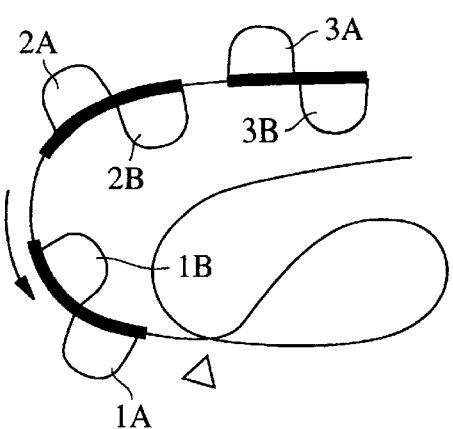
Figure 3C:
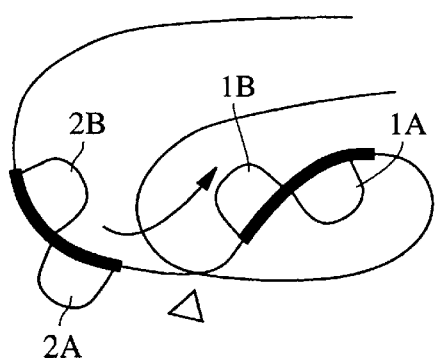
Figure 3D:
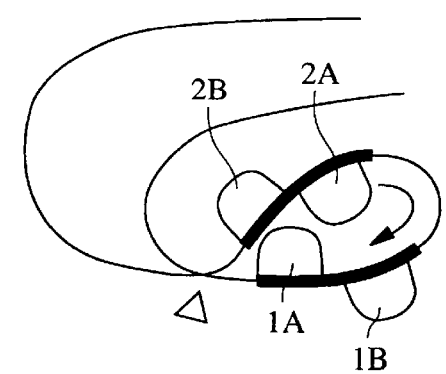
Figure 3E:
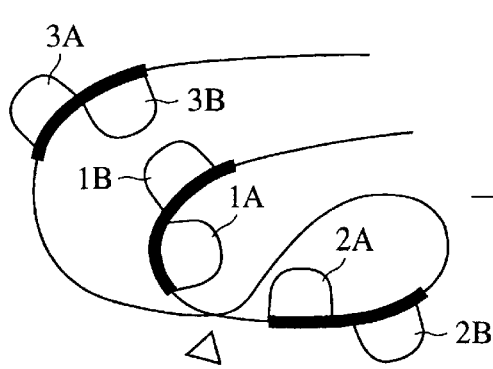
Figure 3F:
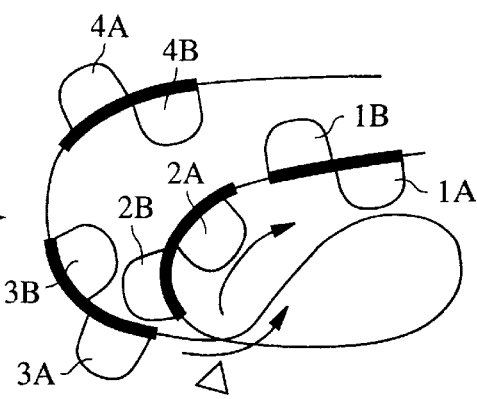

Referring now to FIG. 2, a basic operation of the ADF 200 is explained. FIG. 2 shows a longitudinal sectional view of a construction of the ADF 200 and the scanner unit 250 described above. In FIG. 2, numeral 201 denotes a document sheet tray for stacking document sheets, numeral 202 denotes a first mirror for directing a reflected light from the document sheet to the CCD 111, numeral 203 denotes a moving read document sheet read position, numeral 204 denotes a book mode scan read position, numeral 205 denotes a sheet feed unit, numeral 206 denotes a feed path to the moving read document sheet read position 203, numeral 207 denotes a feed path to eject a one-side document sheet read at the moving read document sheet read position 203, numeral 208 denotes a feed path to feed a rear side of the document sheet read in the moving read document sheet read position 203 to the moving read document sheet read position 203 and numeral 209 denotes a feed path to eject the document sheet after the rear side thereof is read in the moving read document sheet read position 203.

The moving read document sheet reading is the system in which the document sheet fed from the document sheet tray 201 is moved past the moving read document sheet read position 203 while the mirror 202 is fixed at the moving read document sheet read position 203 to scan the image. The document sheet is fed along the arrow marked on the feed path. When the rear side of the document sheet is read, it is read as a mirror image to the image read from the front side of the document sheet. A process to correct the mirror image to a real image will be described in connection with an image processing unit 61. In the drawing, the solid line arrow indicates the feed direction of the moving read of the one-side document sheet and the broken line arrow indicates the feed direction of the moving read of the dual-side document sheet.

Contrarily to the moving read document sheet read system, the book mode scan is the system in which the scan is made while the optical system such as the mirror 202 and a lamp 213 is moved without moving the document sheet mounted on the book mode scan read position 204.

In any system, the read unit is moved relative to the document sheet to scan the document sheet.

The reflected light by the exposure to the document sheet passes through a lens 210 and is projected to the CCD line sensor (hereinafter referred to as a CCD) 111 and it is photo-electrically converted. In the construction shown in FIG. 2, for the longitudinal feed (portrait feed), the feed path 206 has a length to accommodate two A4-size document sheets. For the longitudinal feed (portrait feed) along a short side of the document sheet, the feed path 208 has a length to accommodate two A4-size document sheets. For the lateral feed (landscape feed) to feed the document sheet along a long side, the feed paths 206 and 208 have a length to accommodate one A3-size document sheet.

The document sheet mounted on the feed tray 201 are in a face-up leading-page process in which the document sheet front side faces up and the leading page is stacked at the top. In the one-side moving read, the document sheets are sequentially read along the solid line arrow, and in the dual-side moving read, the half-size document sheets (A4 longitudinal, B5 longitudinal, A5 longitudinal) assume a different sheet feed sequence. The half-size documents are fed two sheets at a time and the rear side reading is conducted through the feed path 208 for the two document sheets read at the moving read document sheet read position 203. Simultaneously with the completion of the reading of the two document sheets of the rear-side reading, the reading of the front sides of the next two document sheets is started. Namely, the reading is conducted in the sequence of the front side of the first document sheet, the front side of the second document sheet, the rear side of the first document sheet, the rear side of the second document sheet, the front side of the third document sheet, the front side of the fourth document sheet, the rear side of the third document sheet, . . . .

The dual-side document sheet read operation is shown in FIG. 3. In FIG. 3, numerals 1A and 2A denote the document sheet images of the front side of the first and the front side of the second, respectively, numerals 1B and 2B denote document sheet images of the rear side of the first and the rear side of the second, respectively. numerals 3A and 4A denote document sheet images of the front side of the third and the front side of the fourth, respectively, and numerals 3B and 4B denote document sheet images of the rear side of third and the rear side of the fourth, respectively.

In the ADF 200 shown in FIG. 2, a non-circulation type document sheet feed unit is used in which the document sheet mounted on the document sheet tray 201 is not returned to the document sheet tray 201 but returned to a return tray 231. The sheet feed unit 205 and the feed paths 206, 207, 208 and 209 shown in FIG. 2 assume an independently driven construction so that they may be individually driven, stopped and speed-controlled. The document sheet feed in the ADF 200 is controlled by the controller 123 (see FIG. 4A) based on the designation from the OCU 53 and the status of the PBM (print buffer memory) 65.

In FIG. 2, numeral 211 denotes a waiting position in the feed path 206 and numeral 212 denotes a waiting position in the feed path 208. They are positions at which the document sheets are stopped in the feed paths in accordance with the status of the PBM 65 to be described later and the position control is conducted based on the sheet detection sensor pass time and the feed speed. In FIG. 2, numeral 230 denotes a feed path along which the document sheet is returned to the return tray 231.

Figures 4, 4A:
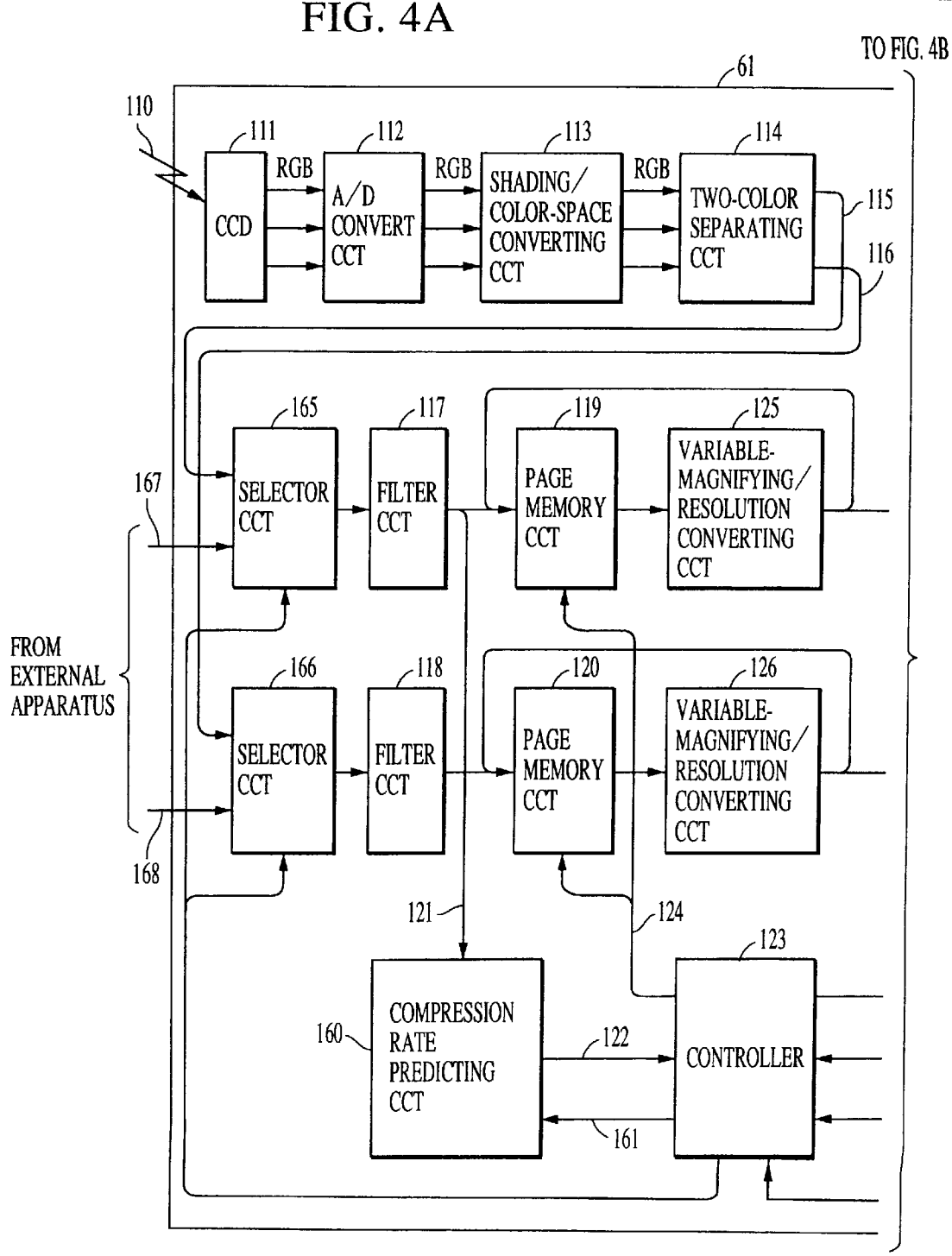
FIG. 4, consisting of FIGS. 4A and 4B, is a block diagram showing the inner construction of the image processing apparatus of FIG. 1.
Figure 4B:
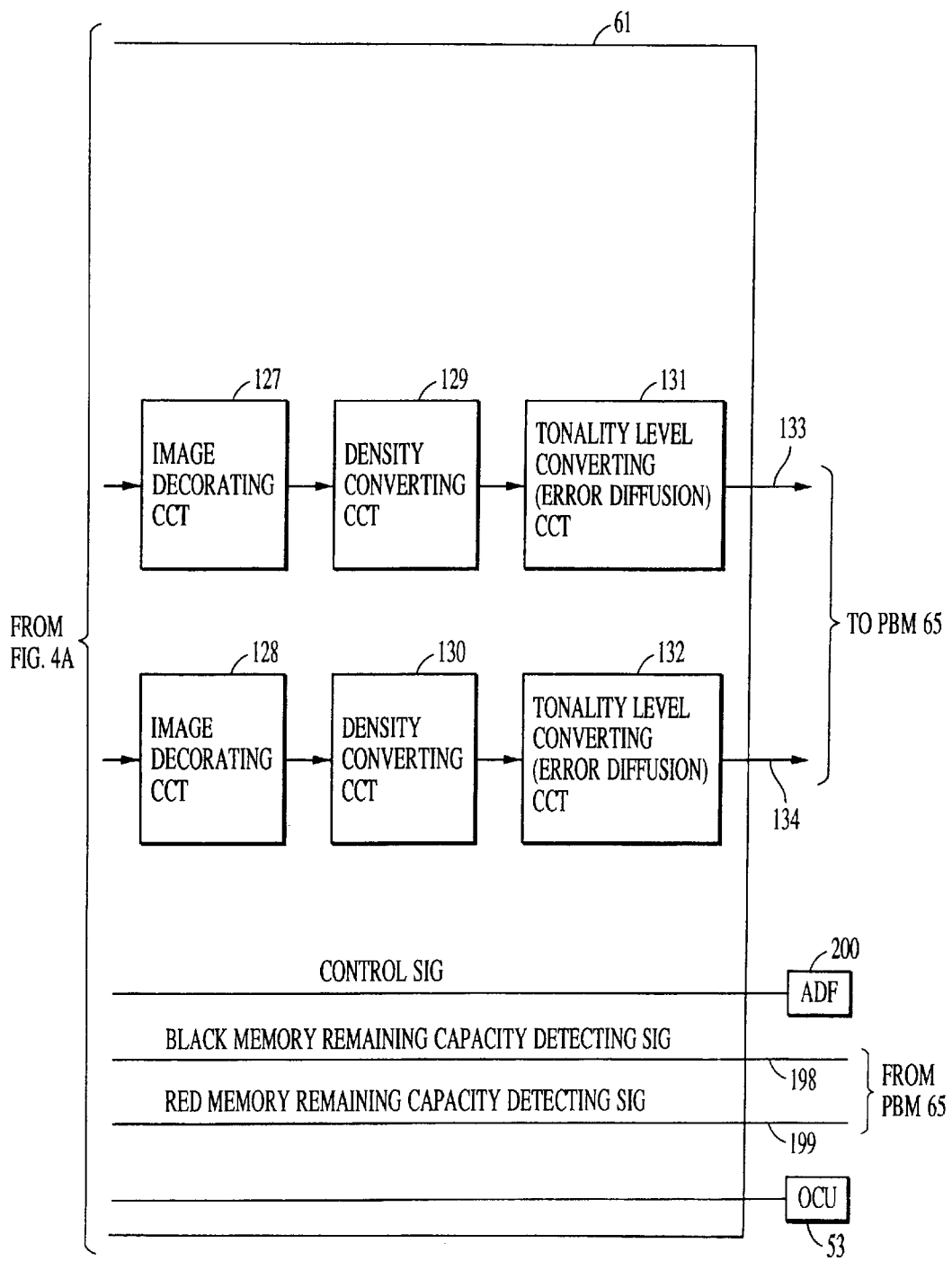

Referring to FIGS. 4A and 4B, the image processing unit 61 which conducts the image processing to the read image data is explained in detail. FIGS. 4A and 4B show a block diagram of a configuration of the image processing unit 61. In FIGS. 4A and 4B, the reflected light 111 of the document sheet reached to the document sheet read position is sensed by the CCD 111 and it is photo-electrically converted to generate RGB (red, green and blue) electrical signals. The generated image signals are amplified and then converted by an A/D (analog-to-digital) converter 112 to digital image signals. The digital RGB signals are black-corrected/white-corrected (shading-corrected) and color-corrected (masked) by a shading/color space conversion circuit 113 for normalization and standardization. The standardized RGB signals are brilliance/density converted and black/red two-color separated by a two-color separation circuit 114 to generate a black image data signal 115 and a red image data signal 116.

The subsequent process is conducted by independent circuit configurations for the black image data signal and the red image data signal in parallel. Selector circuits 165 and 166 select the image data 115 and 116 inputted from the CCD 111 or the black image data signal 167 and the red image data signal 168 externally inputted from the PC. The selection is based on the setting of the OCU 53.

Figure 5A:
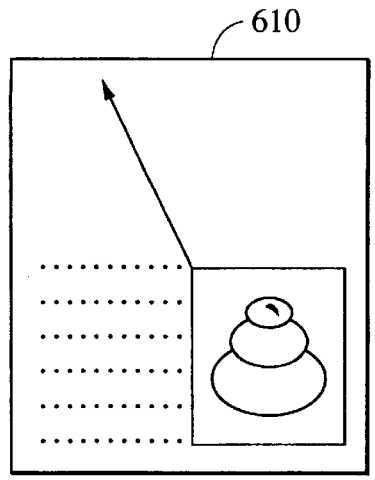
FIGS. 5A and 5B constitutes a diagram illustrating an example of the image processing of the image processing apparatus illustrated in FIG. 1.
Figure 5B:
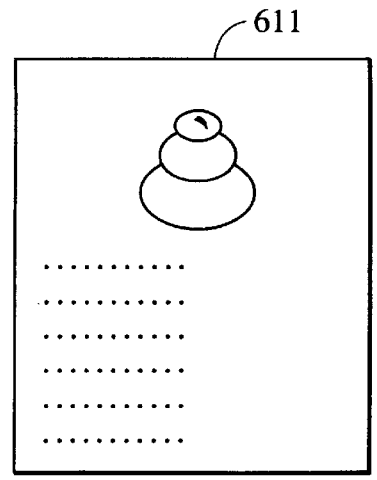
Figure 6A:
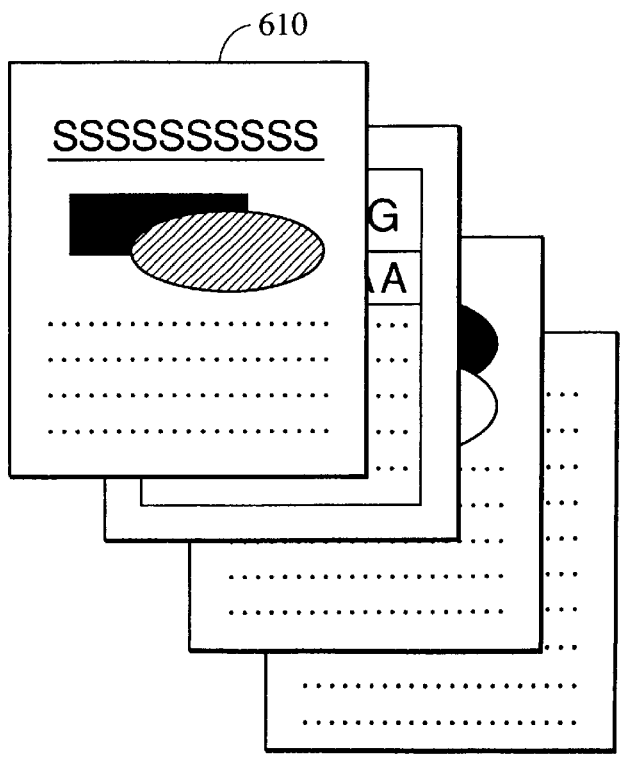
FIGS. 6A and 6B constitutes a diagram illustrating another example of the image processing of the image processing apparatus illustrated in FIG. 1.
Figure 6B:
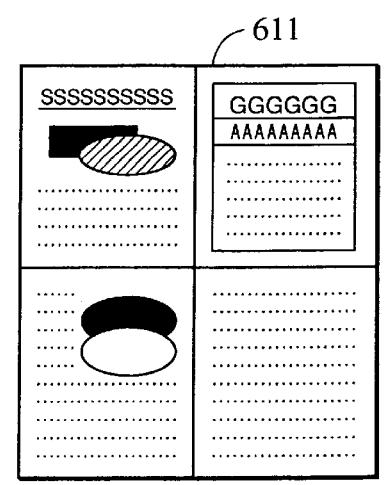
Figure 7A:
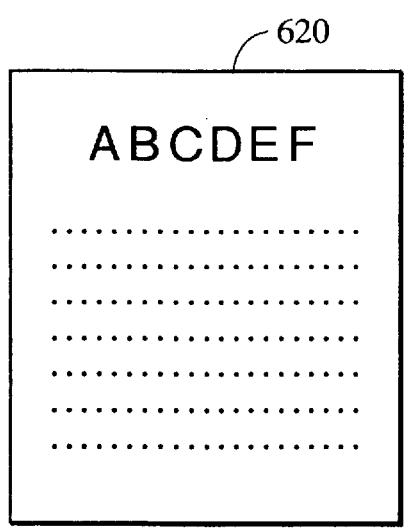
FIGS. 7A and 7B constitutes a diagram illustrating yet another example of the image processing of the image processing apparatus illustrated in FIG. 1, different from the examples illustrated in FIGS. 5A and 5B and FIGS. 6A and 6B.
Figure 7B:
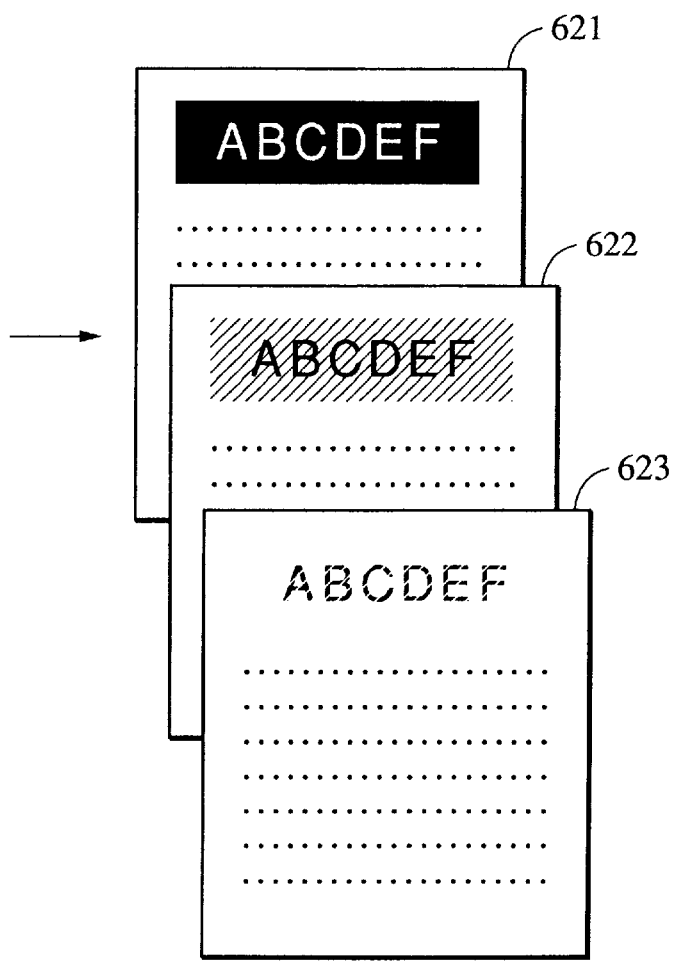

In filter circuits 117 and 118, the filtering is conducted in order to recover the reduction of MTF during the reading of the image and weaken a moare pattern generated in reading a mesh document sheet. Each of page memories 119 and 120 has a capacity to store one page of up to A3 size image. In the image read by the bi-directional document sheet feeder, the image read in the opposite direction to the forward direction is in a mirror image. The image read in the mirror image is further mirror-image processed to convert it to a real image by using the page memories 119 and 120. A process to attain a cut and paste function to move a specified area of a document sheet image 610 as shown in (a) of FIG. 5 to other area to create an image 611 as shown in (b) of FIG. 5 and a reduction layout function to reduce input document sheet images of a plurality of sheets by a factor of 50% by succeeding stage variable magnification/resolution conversion circuits 125 and 126 to form four-sheet document image 610 as shown in (a) of FIG. 6 into an image 611 on one sheet as shown in (b) of FIG. 6 are also conducted on the page memories 119 and 120 by the memory control signal 124 from the controller 123. The variable magnification/ resolution conversion circuits 125 and 126 conduct the reduction layout function as well as the conventional image size conversion. Image modification circuits 127 and 128 attain the functions to form an image 621 as shown in (b) of FIG. 7 negative-positive reversed by designating an area on the document sheet image as shown in (a) of FIG. 7, a meshed image 622 and a meshed image 623 by designating an area to the document sheet image 620.

Density conversion circuits 129 and 130 conduct gamma conversion for correcting the linearity characteristic of the printer unit 51 and the process to reflect the density adjustment level inputted by the user to the image data. The image data heretofore are 8-bit 256-tone signals but tone conversion (error dispersion circuits 131 and 132 convert them to printable 4-bit 16-tone image signals that is, black image data signal 133 and red image data signal 134. In order to cancel the irregularity in the density caused by the conversion of the number of tones when viewed for a certain area, the error due to the tone conversion is dispersed (or diffused).

The image signal processing operation conducted by the image processing unit 61 has thus been described.

The PBM (print buffer memory) 65 for storing a large number of pages of image for printing is now explained. FIG. 8 shows the block diagram of a configuration of the PBM 65. In FIG. 8, the black image data signal 133 and the red image data signal 134 inputted from the image processing unit 61 to the PBM 65 are coded by a compression process of a variable length reversible compression system of compression circuits 150 and 153. The variable length reversible system has a property that the data amount after the compression differs from input image to input image but the image which is same as the input image can be restored after the decompression process and it is compared with a fixed length non-reversible compression system such as the JPEG. The variable length reversible compression system includes MH, Q-Coder and Lempel Ziv, and any one of them may be used. DRAMs 151 and 154 form a memory unit in the PBM 65 and comprise a semiconductor memory or a hard disk and a control unit for addressing it. When page rearrangement such as a pamphlet mode (page 1 and page N are recorded on front pages and page 2 and page N−1 are recorded on rear pages thereof, and other pages are arranged in the same manner) is conducted, it is attained by controlling the addressing in the DRAMs 151 and 154. The image to be printed out is read from the DRAMs 151 and 154 and it is restored to the original image data by decompression circuits 152 and 153. The read timing for the black image data signal 135 is that required to form the black image and the read timing for the red image data signal 136 is that required to form the red image and they are read independently. The DRAMs 151 and 154 store the image data relating to all jobs. Remaining capacity detection circuits 157 and 158 detect capacities of storable area of the DRAMs 151 and 154, respectively, and output the detection results as a black memory remaining capacity detection signal 198 and a red memory remaining capacity detection signal 199. The black image data signal 135 and the red image data signal 136 are outputted to a D/A converter and a laser driver.

Figure 9A:
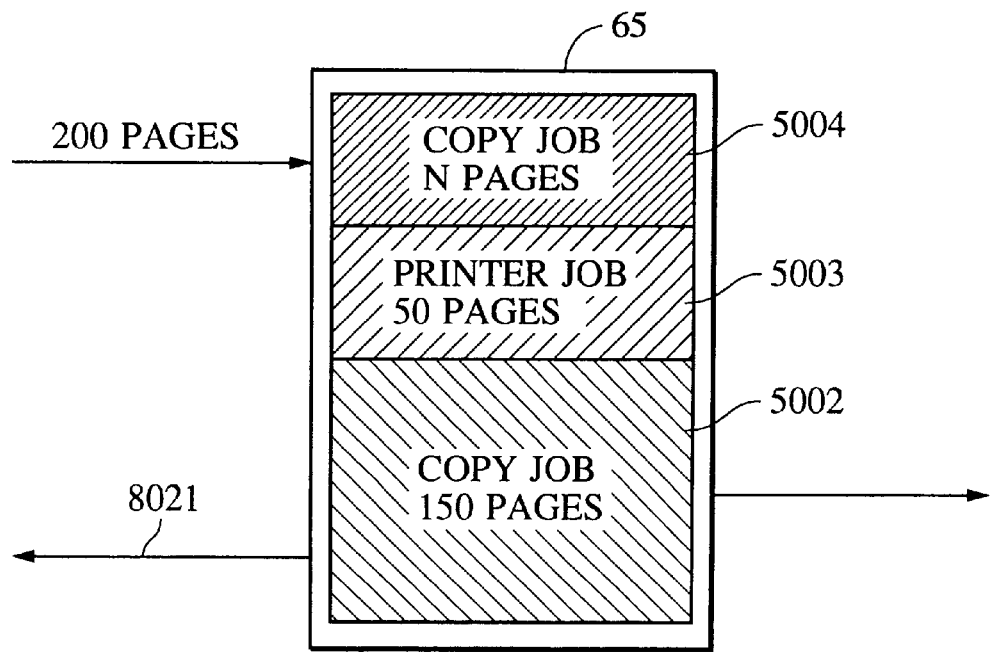
FIGS. 9A and 9B constitutes a diagram illustrating the job operation of the print buffer memory.
Figure 9B:
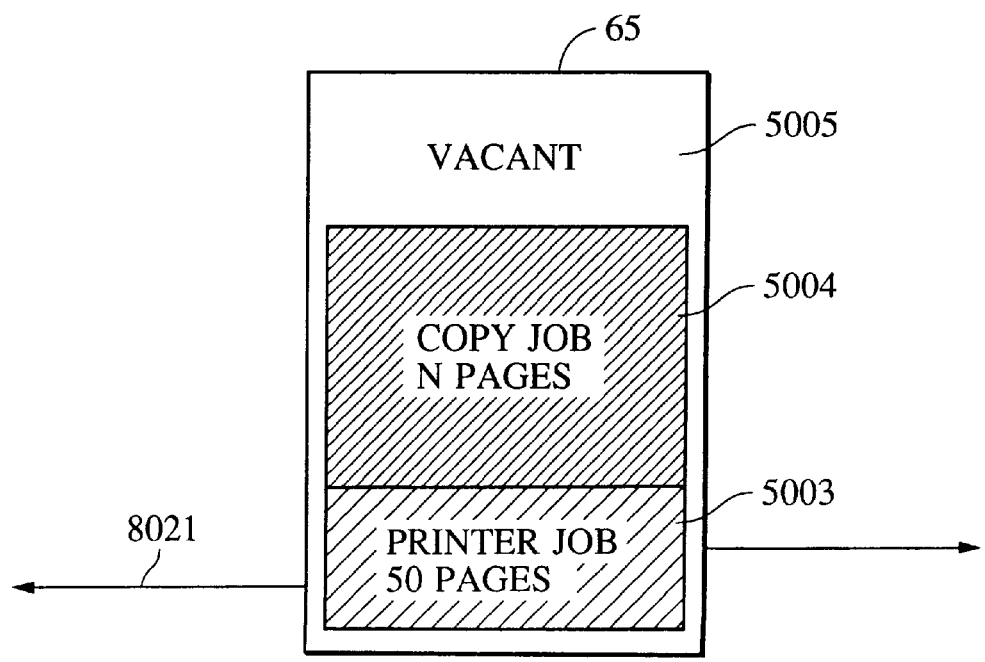

Referring to FIGS. 9A and 9B, an operation thereof is explained. FIGS. 9A and 9B show a conceptual view of the PBM 65. In FIG. 9A, numeral 5002 denotes a copy job (to record in accordance with the image read by the CCD 111) which is being printed and copies 100 sets of 150 pages of document sheets. The pages 1 to 150 are sequentially read, but each set, for print out and then finishing process is conducted. Numeral 5003 denotes a job which is withheld as the job to be executed next and it finishes 60 sets of 50 pages by a print job (to record in accordance with the image data inputted from the PC) requested from the external equipment such as the PC. Numeral 5004 denotes a copy job of 50 sets of 200 pages. It is in the course of reading the image for 200 pages. In this case, the PBM 65 becomes full before the completion of the storing of 200 pages of image data and the read operation is temporarily interrupted. The job 5002 prints out pages 1 to 150 of the last 100th set which has been continuously read and the image for the printed-out pages is no longer need be stored and it is replaced with the image of the withheld job 5004. When the job 5002 is completed, the printing of the withheld job 5003 is started. Numeral 8021 denotes status information of the PBM.

In FIG. 9B, numeral 5005 denotes a vacant area in the PBM 15 to which other jobs may be inputted (stored) so long as the memory capacity permits.

Referring to FIG. 4, compression factor prediction is described. The image data stored in the DRAMs 151 and 154 of the PBM 65 have been compressed by the compression circuits 150 and 153 and the compression factors thereof differ depending on the image data amount, the content thereof and the process to the image data. Thus, a compression prediction circuit 160 predicts the compression factor of the image stored in the page memories 119 and 120 which is to be stored in the PBM 65 based on the modification information (meshing in (b) of FIG. 7, partial movement in FIG. 12) of the image obtained from the controller 128 through a bus 161, the magnification information (reduction layout of FIG. 13) and the operations of the selected density conversion circuits 129 and 130 and the tone conversion circuits 131 and 132. Namely, the compression factor prediction circuit 160 applies a simple arithmetic operation to the statistics of the image information (a density means value of the image or an entropy which has a high correlation with the compression factor) to determine the prediction value. The arithmetic operation or the coefficient used therefor is changed in accordance with the processing information which indicates the processes applied to the image data. For example, density mean value of the image is used for the prediction and the following formula (1) is used to convert it to the prediction value.

$$\text{Compression factor prediction value} = \text{mean image density value} * a + b \quad (1)$$

where a and b determined in accordance with the contents of the processes of the image. By referring a RAM table, not shown, a and b are determined and they are transmitted to the compression factor prediction circuit 160 through the bus 161. As an example, assuming that the means density value of the image area is 40, the coefficient a for the process is 0.01 and b is 0.1, the prediction value is determined by the following formula (2).

$$\text{Compression factor prediction value} = 40 * 0.01 + 0.1 = 0.5 \quad (2)$$

This represents that the data amount after the compression is ½ of the data amount before the compression.

In this manner, the compression factor prediction circuit 160 predicts the compression factor of the image data stored in the page memories 119 and 120.

Figure 10:
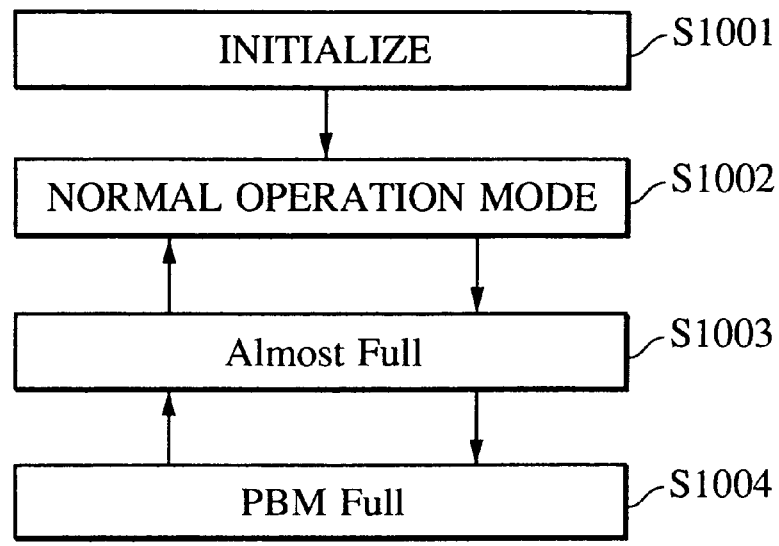
FIG. 10 is a state transition diagram (STD) of the image processing apparatus illustrated in FIG. 1.

Referring to FIG. 10, an operation of the ADF 200 in the image processing apparatus of the present invention is now explained. FIG. 10 shows a STD (status transition diagram) illustrating the status of the ADF 200 in the image processing apparatus of the present embodiment. In FIG. 10, in a step S1001, a power is turned on to initialize the apparatus and the apparatus assumes the normal operation mode in a step S1002. In the normal operation mode, if it is determined that some vacant area is available but it is not sufficient to store the image data for which the compression factor has been predicted, on the basis of the remaining capacity detection signals 198 and 199 (see FIG. 8), the prediction value by the compression factor prediction circuit 160 and the image data amount, an almost full status to be described later is assumed in a step S1003. In the almost full status, if it is determined that the vacant area in the PBM 65 is exhausted based on the remaining capacity detection signals 198 and 199, a PBM full status to be described later is assumed in a step S1004. In the PBM full status, if it is determined that a vacant area is available in the PBM 65 based on the remaining capacity detection signals 198 and 199, the almost full status is assumed in the step S1003. In the almost full status, if it is determined that a room to store the image data for which the compression factor has been predicted is available based on the remaining capacity detection signals 198 and 199, the normal operation mode of the step S1002 is assumed.

Operations in the respective status are explained below.

[Normal Operation Mode]

Figure 11:
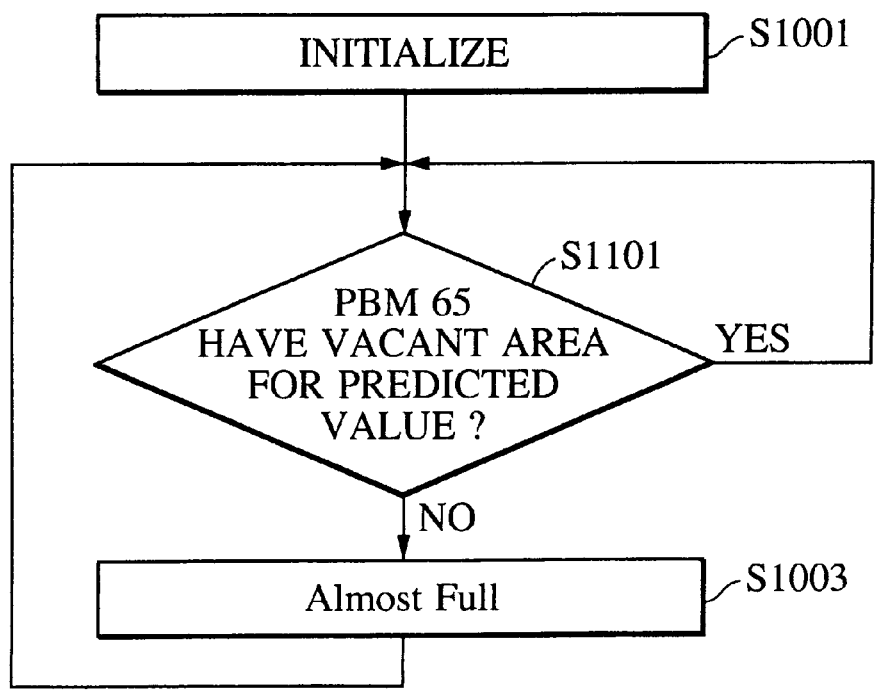
FIG. 11 is a flowchart illustrating the operation control steps in the normal operation mode of the image processing apparatus illustrated in FIG. 1.

The normal operation mode is first explained with reference to a flow chart of FIG. 11. In the normal operation mode in the step S1002 in FIG. 10, whether a room to store the image data for which the compression factor has been predicted is present in the PBM 65 or not is determined in a step S1101 of FIG. 11 based on the remaining capacity detection signals 198 and 199. If there is no room, the process proceeds to the almost full mode (step S1003 of FIG. 10). If there is a room in the step S1101, the normal operation mode is maintained and the decision process of the step S1001 is again conducted. In this manner, when there is a room to store the image data for which the compression factor has been predicted in the PBM 65, the present apparatus repeatedly conducts the decision process in the step S1101.

Figure 14:
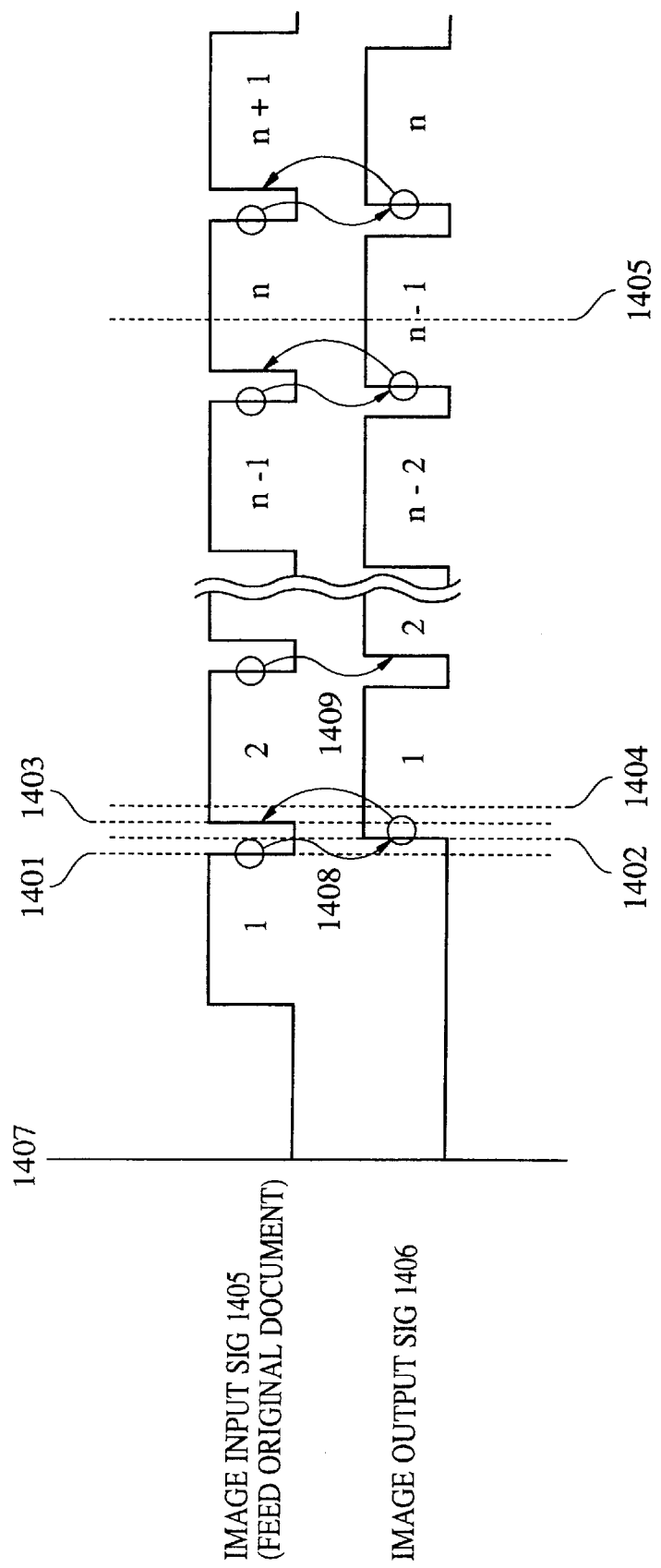
FIG. 14 is a time-chart illustrating the image input-output timing corresponding to page memory in the normal operation mode of the image processing apparatus illustrated in FIG. 1.
Figure 19:
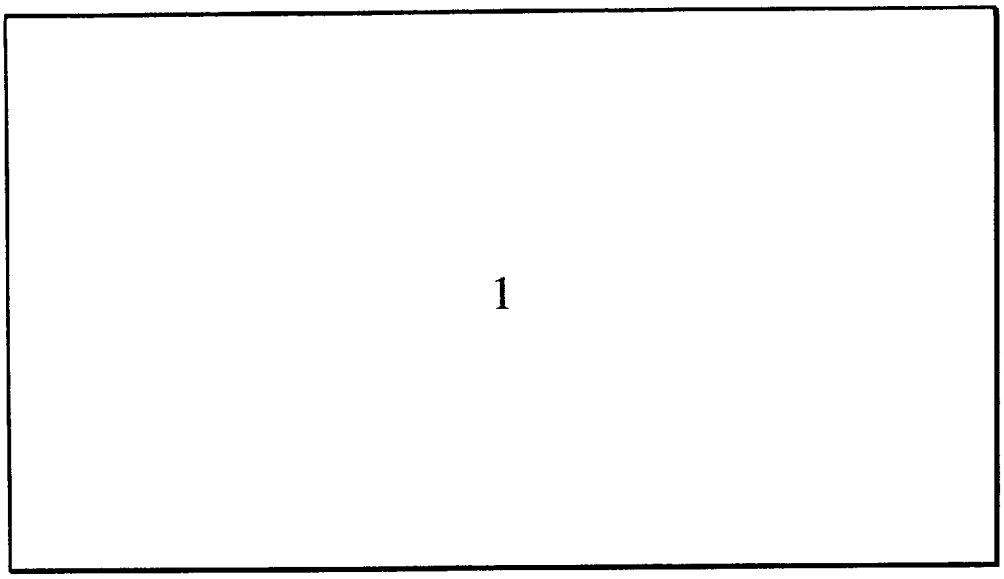
FIG. 19 is a schematic diagram illustrating the page memory in a case wherein image 1 occupies the page memory of the image processing apparatus illustrated in FIG. 1.

An operation timing of an image input signal 1405 inputted to the page memories 119 and 120 and an image output signal 146 outputted from the page memories 119 and 120 is now explained with reference to a timing chart of FIG. 14. The image input signal 1405 is linked to the document sheet feed. In FIG. 14, numerals 1, 2, . . . , n–1, n, n+1 denote the sequence of the read document sheet. From the document sheet scan start (1407), the document sheets fed by the ADF 200, one at a time, are sequentially read by the scanner unit 250 and the image signal from the CCD 111 passes through the filters 117 and 118 and stored in the page memory 119 or 120. Thereafter, the storing of one page of image data is completed (1401). The page memory 119 or 120 in this status is shown in FIG. 19. As shown in FIG. 19, when the document sheet is of A3-size, the entire area of the page memory 119 or 120 is occupied by the first page of data.

Figure 20:
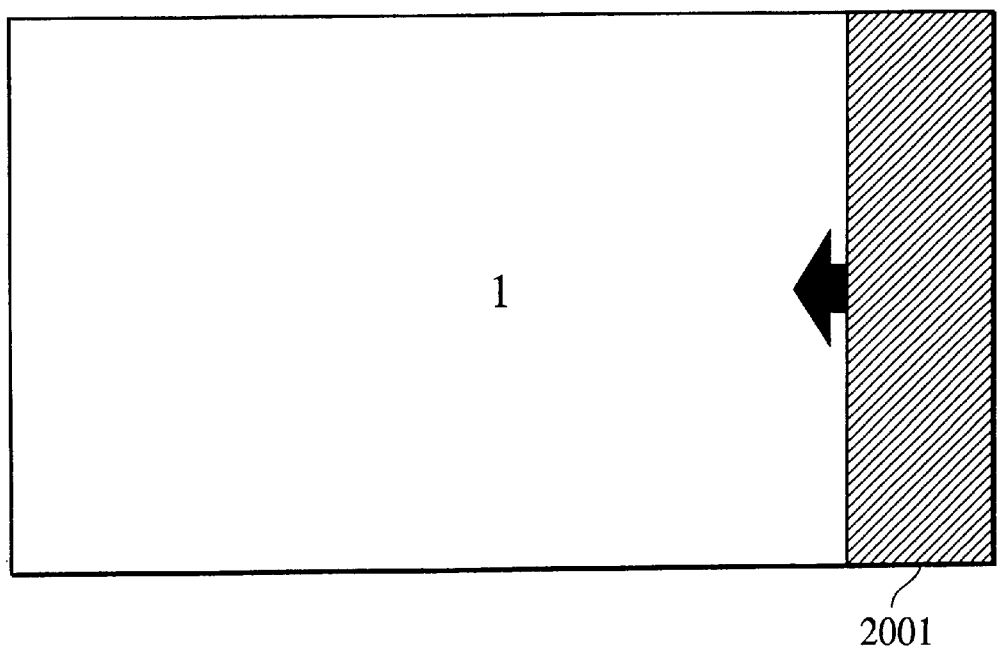
FIG. 20 is a schematic diagram illustrating the page memory in a case wherein output of the image 1 from the page memory of the image processing apparatus illustrated in FIG. 1 begins.

Upon completion of one page of image input (1408), the controller 123 starts to output the image signal from the page memory 119 or 120 to the PBM 65. Upon the start of the image output (1409), the controller 123 commands to the ADF 200 to feed the next document sheet to the moving read position 203. In this manner, the storing of the document sheet data of the second page to the page memory 119 or 120 is started (1403). The page memory 119 or 120 in this status is shown in FIG. 20. As shown in FIG. 20, the areas of the page memory 119 or 120 from which the images have been outputted are sequentially released as an open area 2001.

Figure 21:
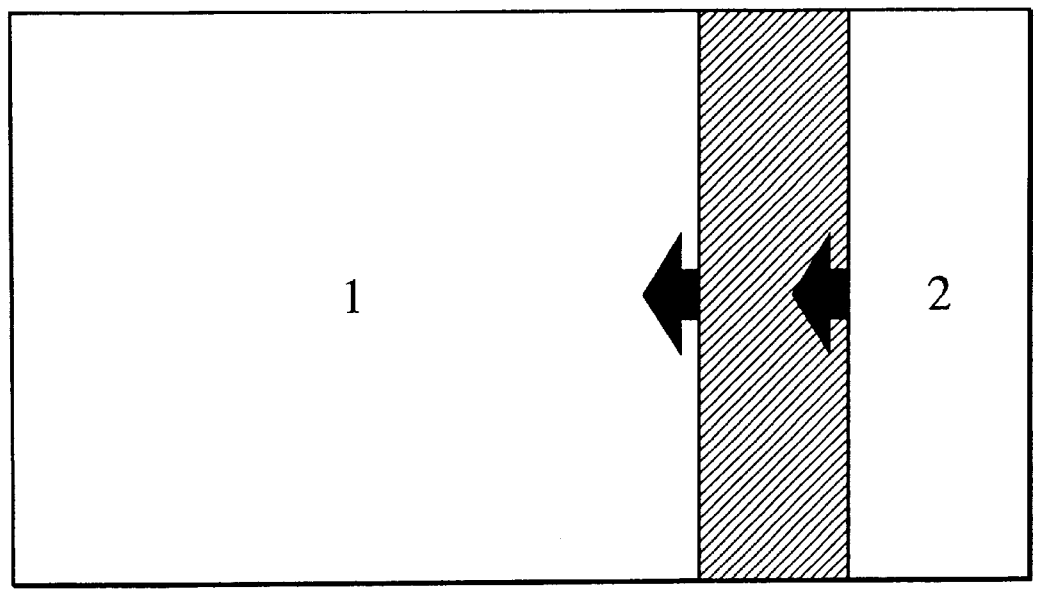
FIG. 21 is a schematic diagram illustrating the page memory in a case wherein image 1 and image 2 co-occupy the page memory of the image processing apparatus illustrated in FIG. 1.
Figure 22:
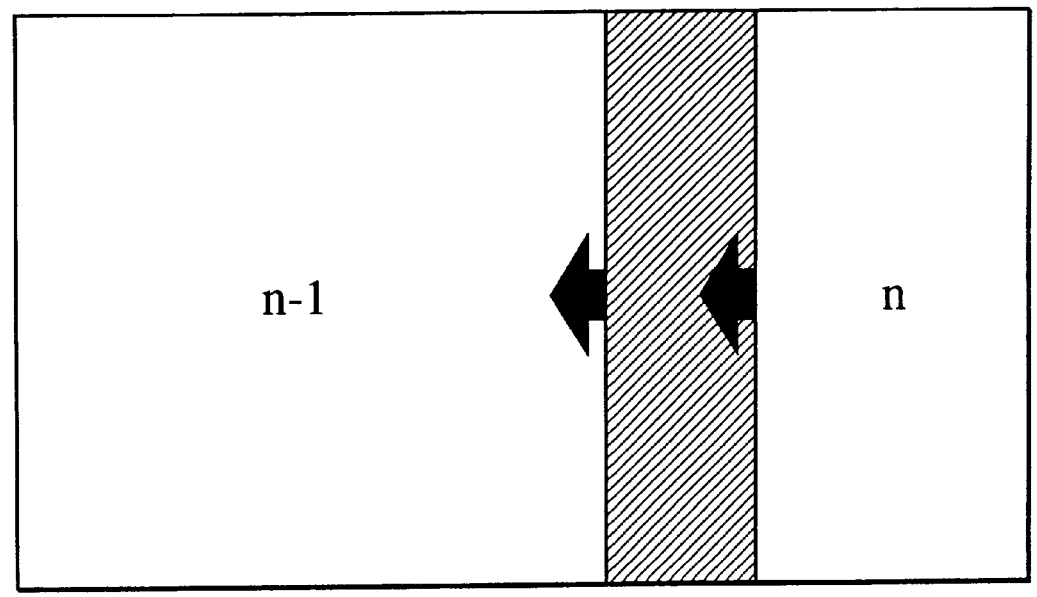
FIG. 22 is a schematic diagram illustrating the page memory in a case wherein image n-1 and image n co-occupy the page memory of the image processing apparatus illustrated in FIG. 1.

The second page of document sheet is written into the open area 2001, and at a time 1404 of FIG. 14, the page memory 119 or 120 assumes a status as shown in FIG. 21. In general, during the period of outputting the page (n–1) and inputting the page n (1405), two pages of image data as shown in FIG. 22 coexist in the page memory 119 or 120.

[Transition from Normal Operation Mode to Almost Full Mode]

As described above, in the step S1101 FIG. 11, when the controller 123 determines a possibility of the full status of the PBM based on the image data amount for which the compression factor has been predicted and the remaining capacity detection signals 198 and 199, the almost full mode of the step S1003 of FIG. 10 is assumed.

Figure 15:
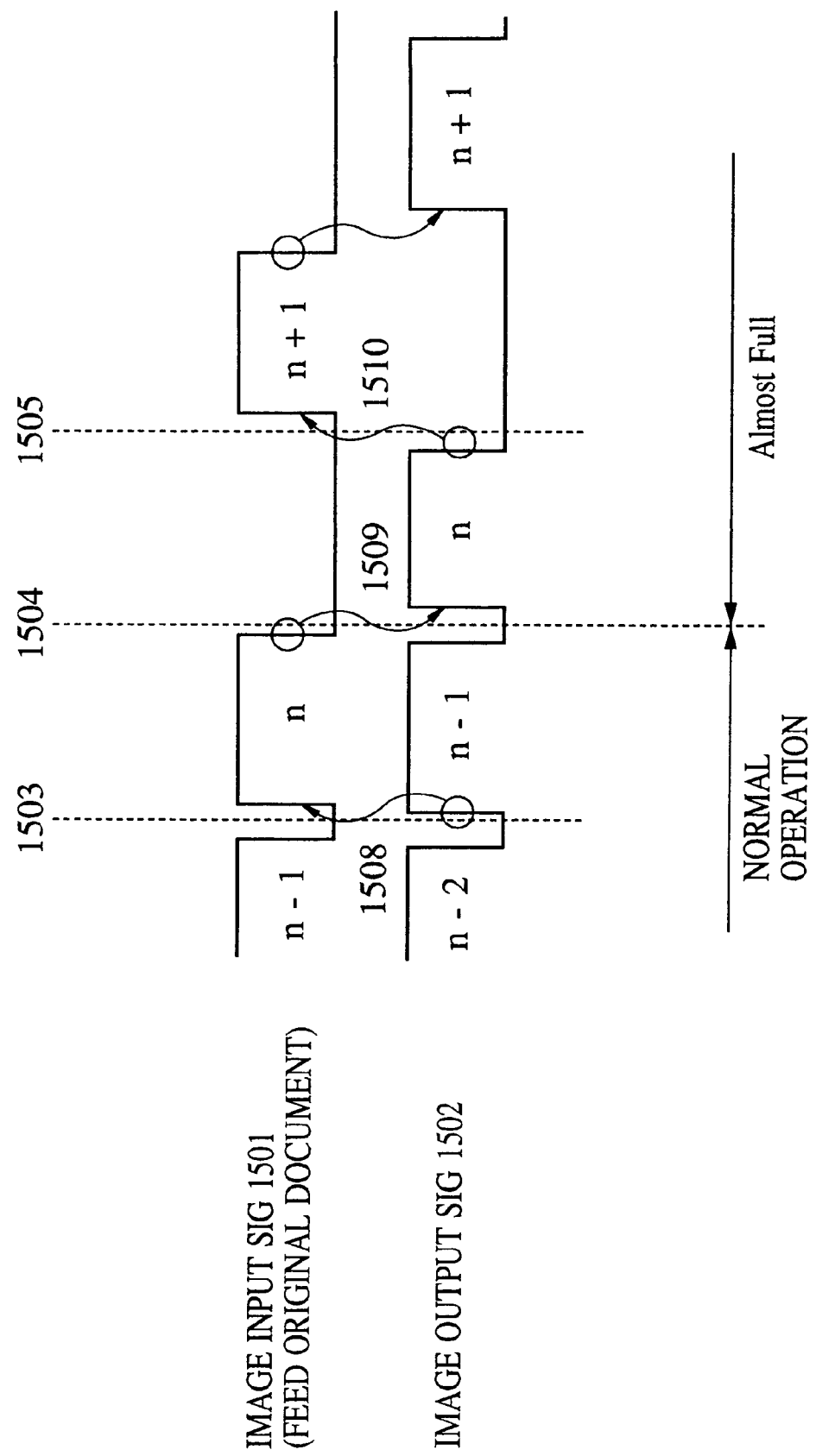
FIG. 15 is a time-chart illustrating the image input-output timing corresponding to page memory at time of transition from normal operation mode to Almost Full mode of the image processing apparatus illustrated in FIG. 1.

An operation of the transition is explained with reference to the timing chart of FIG. 15. In FIG. 15, n–1, n, n+1, n+2 denote the sequence of the read document sheets. Numerals 1501 and 1502 denote input and output of the document sheet data, respectively, for the page memory 119 or 120. In FIG. 15, the process operates in the normal operation mode of the step S1002 of FIG. 3, until the room to store one page of document sheet disappears in the PBM 65 (1504). After the time 1504 of FIG. 15, the PBM 65 does not have the room to store one page of image data so that whether the image data currently stored in the page memory 119 or 120 can be stored in the PBM 65 or not can be first determined by actually storing the image data in the PBM 65. This status is referred to as the almost full mode. In this status, since an operation to check whether the n-th image data has been actually stored in the PBM 65 or not is needed, the storing of the next page of image data to the page memory 119 or 120 cannot be executed until the check is completed. Accordingly, the ADF 200 shown in FIG. 2 is operated to limit the number of sheets per unit time fed by the fed unit 205. Namely, the document sheet interval is set longer than that in the normal operation mode (skip operation or step operation) so that the feed can be stopped at any time. When the mode is changed to the almost full mode, the controller 123 of FIG. 4 commands the operation of this sequence to the ADF 200 and the skip operation sequence is continued until the almost full mode is released.

The sequence in the almost full mode may be conducted by controlling the number of sheets per unit time to be fed by the feed unit 205 of the ADF 200 of FIG. 2 as shown in the present embodiment, or by controlling the sheet feed speed and the feed speed in the feed path 206.

[Almost Full Mode]

An operation in the almost full mode is explained with reference to a flow chart of FIG. 12. In the almost full mode of the step S1003 of FIG. 10, whether a room to store the image data for which the compression factor has been predicted is present in the PBM 65 or not is always monitored based on the remaining capacity detection signals 198 and 199, and if the room is available, the process is shifted to the normal operation mode. Further, whether a vacant area is present in the PBM 65 or not is monitored, and if no vacant area is available, the process assumes the PBM full mode as described above.

When the mode is changed from the normal operation mode to the almost full mode, whether a room to store the image data for which the compression factor has been predicted is available or not in a step S1202, and if it is available, the process proceeds to the normal operation mode, and if it is not available, the process proceeds to a step S1201. In the step S1201, whether there is a vacant area in the PBM or not is determined, and if there is vacant area, the process proceeds to a step S1202 and if there is no vacant area, the process shifts to the PBM full mode.

Figure 12:
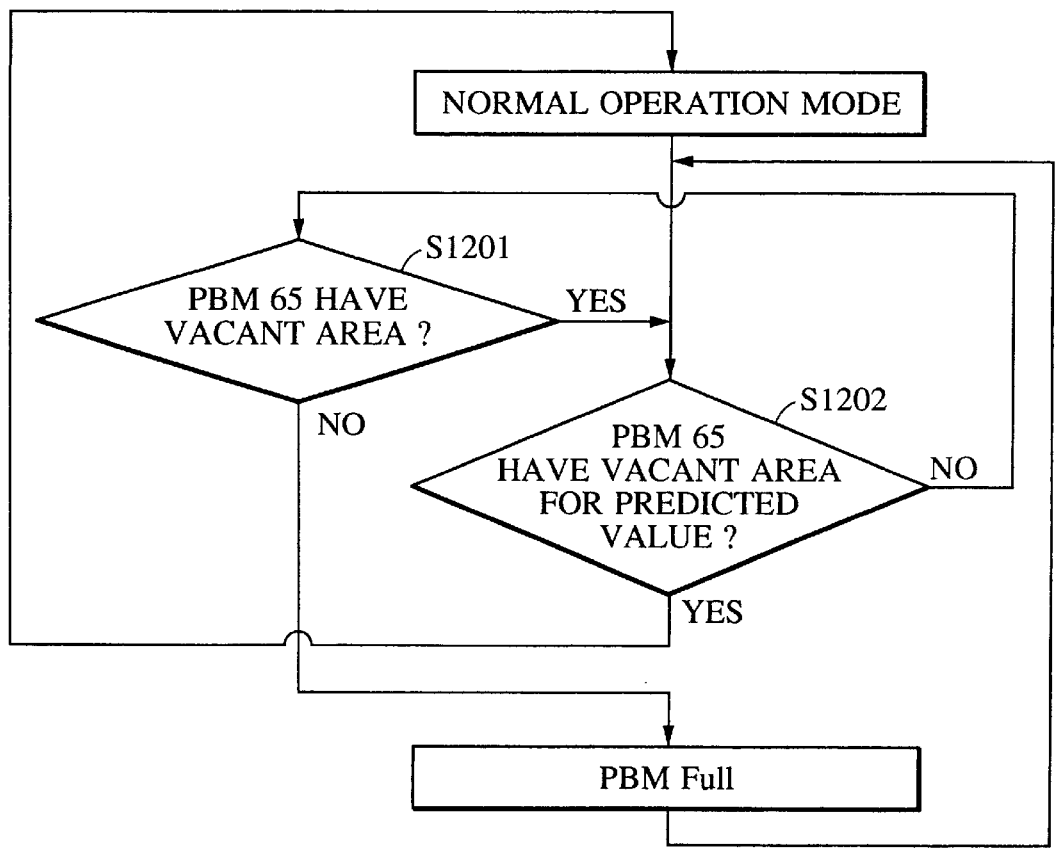
FIG. 12 is a flowchart illustrating the operation control steps in the Almost Full mode of the image processing apparatus illustrated in FIG. 1.

In the almost full mode, in the step S1003 of FIG. 10, the present apparatus alternately transits between the steps S1201 and S1202 of FIG. 12.

An operation in the almost full mode is explained with reference to the timing chart of FIG. 15. In the normal operation mode in the step S1002 of FIG. 10, in response to the start of outputting of the image data of the previous document sheet n from the page memories 119 and 120 (1408 in FIG. 14), the next document sheet (n+1) is fed to the moving read position 203 as described above in connection with the normal operation mode by FIG. 14. In the almost full mode in the step S1003 of FIG. 10, since the image data of the document sheet n is not stored in the PBM 65, the next document sheet (n+1) cannot be read until the storing of the image data of the document sheet n has been stored in the PBM 65. Accordingly, in the almost full mode, the feed of the document sheet (n+1) is not started even if the outputting of the image data of the document sheet n is started. That is, in response to the completion of the image input of the page n (1509), the controller 123 starts the outputting of the image of the page n from the page memory 119 or 120 to the PBM 65. In response to the completion of the image output (1510), the controller 123 releases the areas of the page memories 119 and 120 and commands to the ADF 200 to feed the next document sheet (n+1) to the moving read position 203. In this manner, the storing of the document sheet data of the page (n+1) to the page memory 119 or 120 is started. Subsequently, the completion of the reading of the document sheet and the waiting of the completion of the outputting of the image data are alternately repeated and in the almost full mode in the step S1003 of FIG. 10, the sheet interval of the document sheets in the ADF 200 is increased and the productivity is reduced to approximately one-half of that in the normal operation mode in the step S1002 of FIG. 10. However. since the areas of the page memories 119 and 120 are released after the completion of the outputting of the image data, the read data is not broken.

[Transition from Almost Full Mode to PBM Full Mode]

Referring to a flow chart of FIG. 12, a transition operation from the almost full mode to the PBM full mode is explained. When the controller 123 determines in the monitoring in the step S1201 of FIG. 12 that the PBM 65 is full based on the remaining capacity detection signals 198 and 199, it commands to the PBM 65 to discard the image data of the page which is being lastly stored in the PBM 65 and the management information thereof from the PBM 65 and then shifts the mode to the PBM full mode of the step S1004 of FIG. 10.

Figure 16:
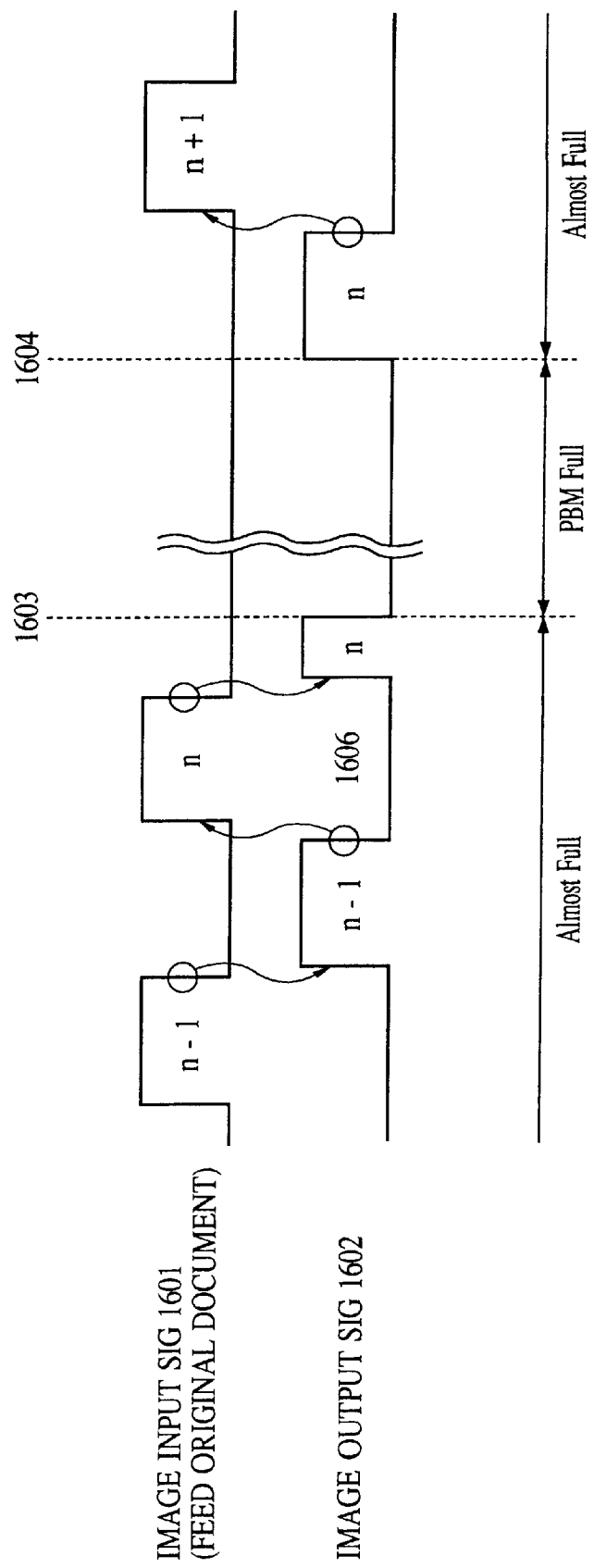
FIG. 16 is a time-chart illustrating the image input-output timing corresponding to page memory at time of transition between Almost Full mode and PBM Full mode of the image processing apparatus illustrated in FIG. 1.

The transition operation is explained with reference to a timing chart of FIG. 16. In FIG. 16, n−1 and n denote the sequence (pages) of the read document sheets. Numerals 1601 and 1602 denotes input and output respectively, of the document sheet data for the page memories 119 and 120. In FIG. 16, numeral 1603 denotes a time at which a vacant area is no longer available in the PBM 65 in the course of outputting the image data of the document sheet n to the PBM 65. The almost full mode operation in the step S1003 of FIG. 10 is conducted until a vacant area in the PBM 65 becomes unavailable (1603). After the time 1603 in FIG. 16, there is no space to store the document sheet data in the PBM 65 and the outputting of the image to the PBM 65 is interrupted. This status is referred to as the PBM full mode. The image of the document sheet n in the page memories 119 and 120 is maintained.

In this status, since the reading of the document sheet is stopped until a vacant area to store the data becomes available in the PBM 65, the ADF 200 shown in FIG. 2 stops the feeding of the sheet by the sheet feed unit and waits for the command to start from the controller 123 of FIG. 4. Namely, at the time of shifting to the PBM full mode, the controller 123 of FIG. 4 commands to the ADF 123 of FIG. 4 to stop the moving read image read sequence operation.

At the time of shifting to the PBM full sequence, the document sheet (n+1) in the feed path is stopped before it reaches the moving read image read position 203.

The document sheet which is in the feed path but the reading therefor has been completed and located at a position which permits the ejection is not stopped but ejected. In FIG. 2, in the one-side read mode, the document sheets are withhold in the feed path 205 and the convey path 206. The document sheet on the convey path 207 is ejected. In the dual-side read mode, the document sheets are withhold in the feed unit 205 and the convey paths 206 and 208 and the document sheet in the convey path 209 is ejected.

As described above, each of the convey paths can be independently driven, stopped and speed-controlled. Accordingly, as shown in FIG. 2, the feed unit 205 or the convey paths 206 and 208 are provided with independent wait positions 211 and 212 to attain the withholding of the document sheet in the PBM full mode.

[PBM Full Mode]

Figure 13:
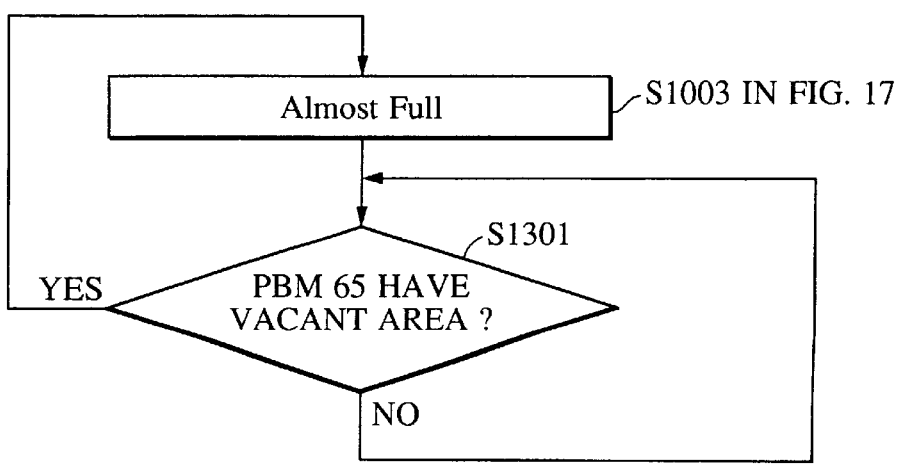
FIG. 13 is a flowchart illustrating the operation control steps in the PBM Full mode of the image processing apparatus illustrated in FIG. 1.

An operation in the PBM full mode is now explained with reference to the flow chart of FIG. 13 and the timing chart of FIG. 16. In the step S1004 of FIG. 10, whether there is a vacant area in the PBM 65 or not is continuously monitored based on the remaining capacity detection signals 198 and 199, and if there is no vacant area, the process returns to the step S1301 of FIG. 13 to monitor whether a vacant area becomes available in the PBM 65 or not. If it is determined that a vacant area is available in the PBM 65, the mode is shifted to the almost full mode of the step S1003 of FIG. 10, and if it is determined that no vacant area is available, the process returns to the step S1301 to conduct the monitoring again. In the PBM full mode of the step S1004 of FIG. 10, the occurrence of a vacant area in the PBM 65 is waited (for a period from 1603 to 1604 in FIG. 16).

The operation of the ADF 200 shown in FIG. 2 is in the stop status and waiting for a resume command from the controller 123.

[Recovery of PBM Full Mode]

The recovery from the PBM full mode is explained with reference to the timing chart of FIG. 16. In the step S1301 of FIG. 13, if it is determined that a vacant area is available in the PBM 65 based on the remaining capacity detection signals 198 and 199, the controller 123 starts to output from the top of the image data stored in the page memories 119 and 120 (the image of the document sheet n outputted to the PBM 65 in the PBM full mode). As described above, the control mode of the controller 123 is in the almost full mode in the step S1003 of FIG. 10 from the start of the image output. If the vacant area of the PBM 65 available at that time is smaller than the capacity to store one page of document sheet and the vacant area in the PBM 65 is again exhausted, the PBM full mode of the step S1004 of FIG. 10 is again assumed and the expansion of the vacant area in the PBM 65 is waited.

When a vacant area is available in the PBM 65 and the almost full mode is assumed and the storing of the image output from the page memories 119 and 120 to the PBM 65 is completed, the controller 123 of FIG. 4 commands to resume the operation of the ADF 200 shown in FIG. 2. When the ADF 200 receives the command, the ADF 200 resumes the feed of the document sheet (n+1) which is standing by in the stand-by positions 211 and 212 of FIG. 2 and the document sheet on the document sheet tray, and resumes the reading at the moving read image read position 203.

[Recovery from Almost Full Mode]

As described above, when the present apparatus shifted from the normal operation mode in the step S1002 of FIG.

10 or the PBM full mode to the almost full mode in the step S1003 determines in the step S1202 of FIG. 12 that the image data for which the compression factor has been predicted may be stored in the PBM 65 based on the remaining capacity detection signals 198 and 199, it assumes the normal operation mode of the step S1002 of FIG. 10.

A recovery operation from the almost full mode is now explained with reference to timing charts of FIGS. 17 and 18.

Figure 17:
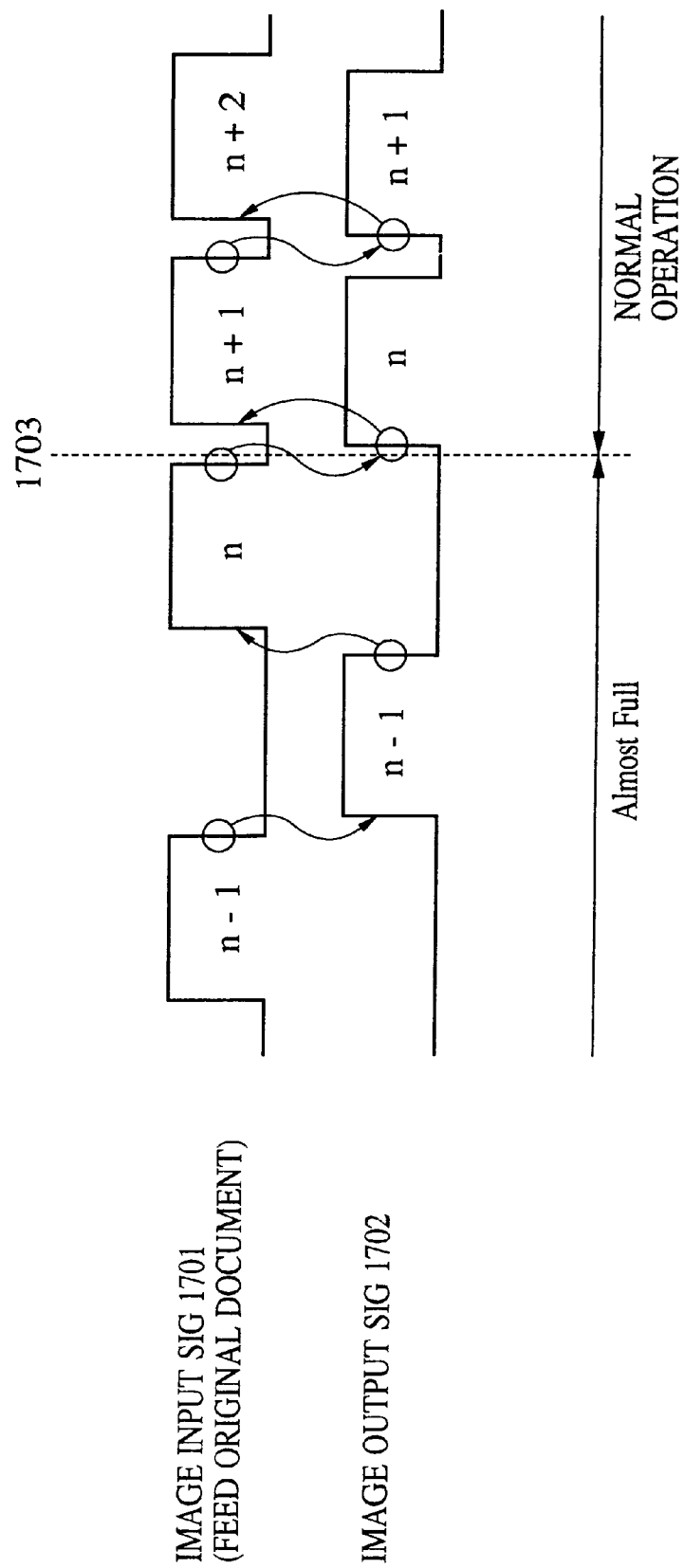
FIG. 17 is a time-chart illustrating the image input-output timing corresponding to page memory at time of recovery from Almost Full mode of the image processing apparatus illustrated in FIG. 1.

FIG. 17 shows a status in which a storage space for the image of the page (n-1) document sheet is created in the PBM 65 by the reading of the image from the PBM 65 during the reading of the page (n-1) document sheet. In FIG. 17, n-1, n, n+1, n+2 denote the sequence of the read document sheets. Numerals 1701 and 1702 denote input and output of the document sheet, respectively, for the page memories 119 and 120. When a vacant area to store the one page of image data for which compression factor has been predicted is not available in the PBM 65, the almost full mode of operation in the step S1003 of FIG. 10 is conducted. After 1703 when the creation of a larger vacant area than predicted in the PBM 65 is detected during the reading of page n document sheet by a reason that the outputting of all of a large image data of other job is completed or other job coexisted in the PBM 65 is discarded, the almost full mode is released and the page (n+1) document sheet may be read without waiting the completion of the page n image data.

Figure 18:
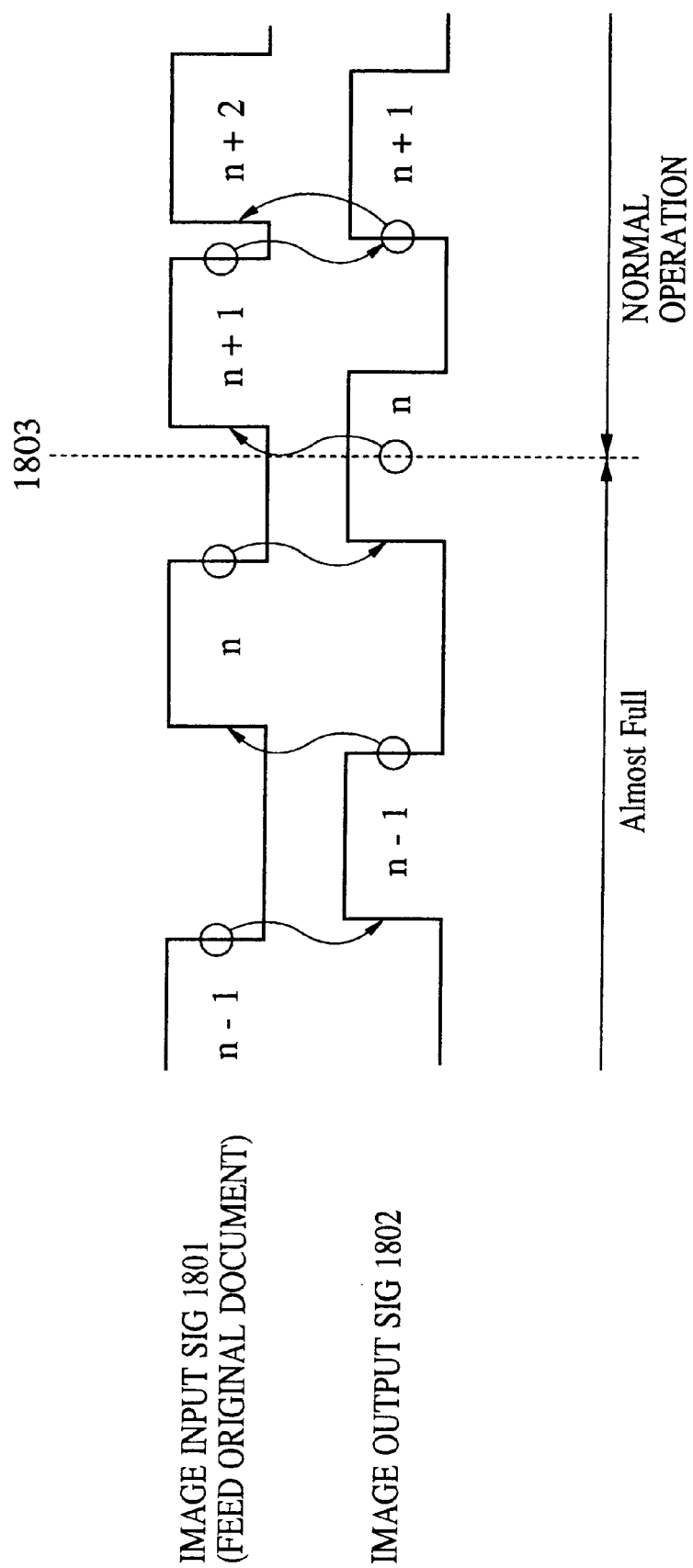
FIG. 18 is a time-chart illustrating the image input-output timing corresponding to page memory at time of recovery from Almost Full mode of the image processing apparatus illustrated in FIG. 1.

FIG. 18 shows a status in which the almost full mode is released during the outputting of the page n image data. In FIG. 18, n-1, n, n+1, n+2 denote the sequence of the read document sheets. Numerals 1801 and 1802 denote input and output of the document sheet, respectively, for the page memories 119 and 120.

Figure 23:
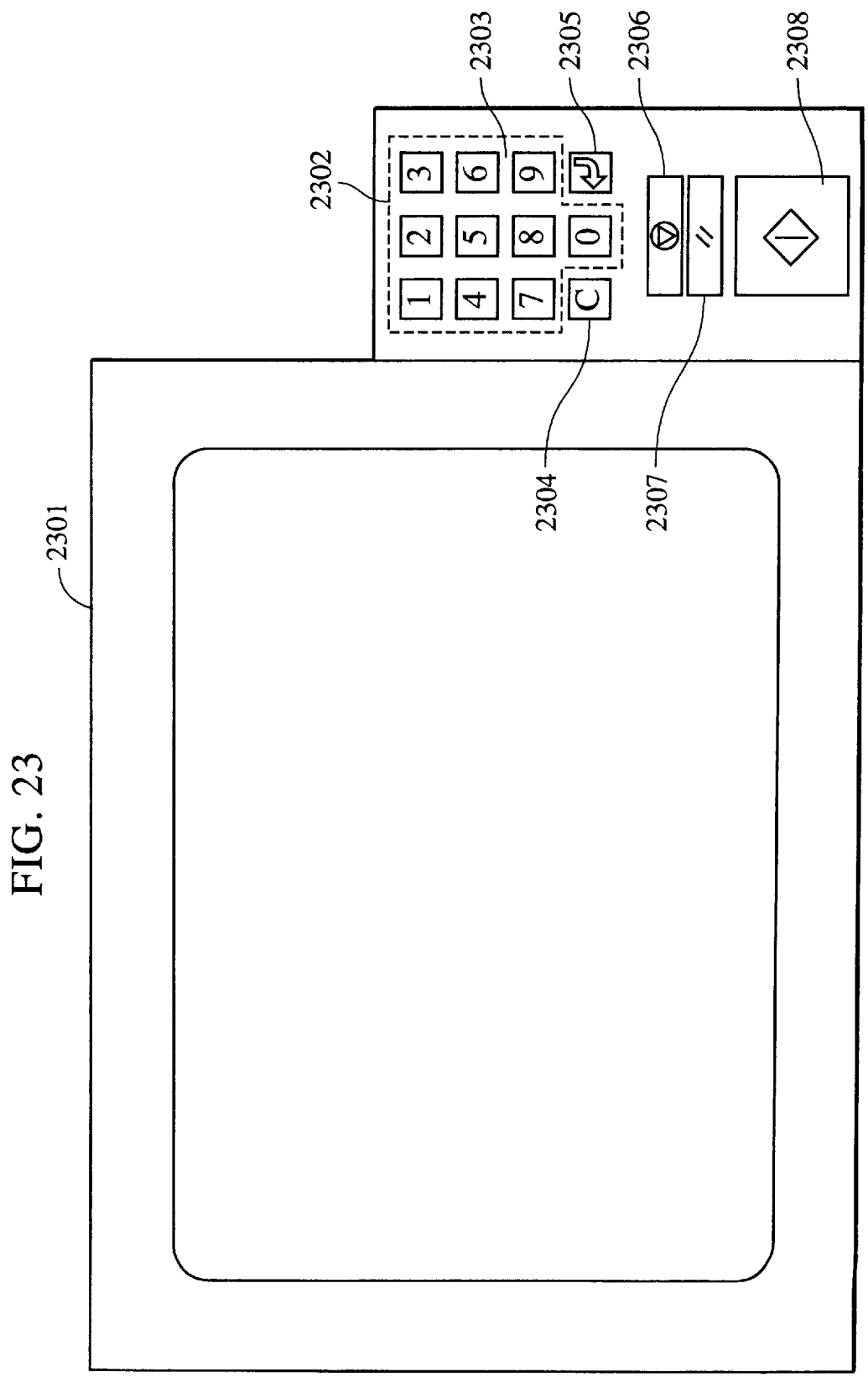
FIG. 23 is a schematic diagram illustrating the operating portion of the image processing apparatus illustrated in FIG. 1.

FIG. 23 shows a conceptual view of the OCU 53. In FIG. 23, numeral 2301 denotes a CRT screen and a user selection is inputted by touch type input. The CRT screen 2301 may be substituted by an LCD or an FLC. Instead of the touch type input, the input by a pointing device such as a mouse or an input pen may be used. Numeral 2302 denotes a key pad, numeral 2303 denotes a numeric ten-key, numeral 2304 denotes a clear key, numeral 2305 denotes an enter key, numeral 2306 denotes a step key, numeral 2307 denotes a reset key and numeral 2308 denotes a start key.

Figure 24:
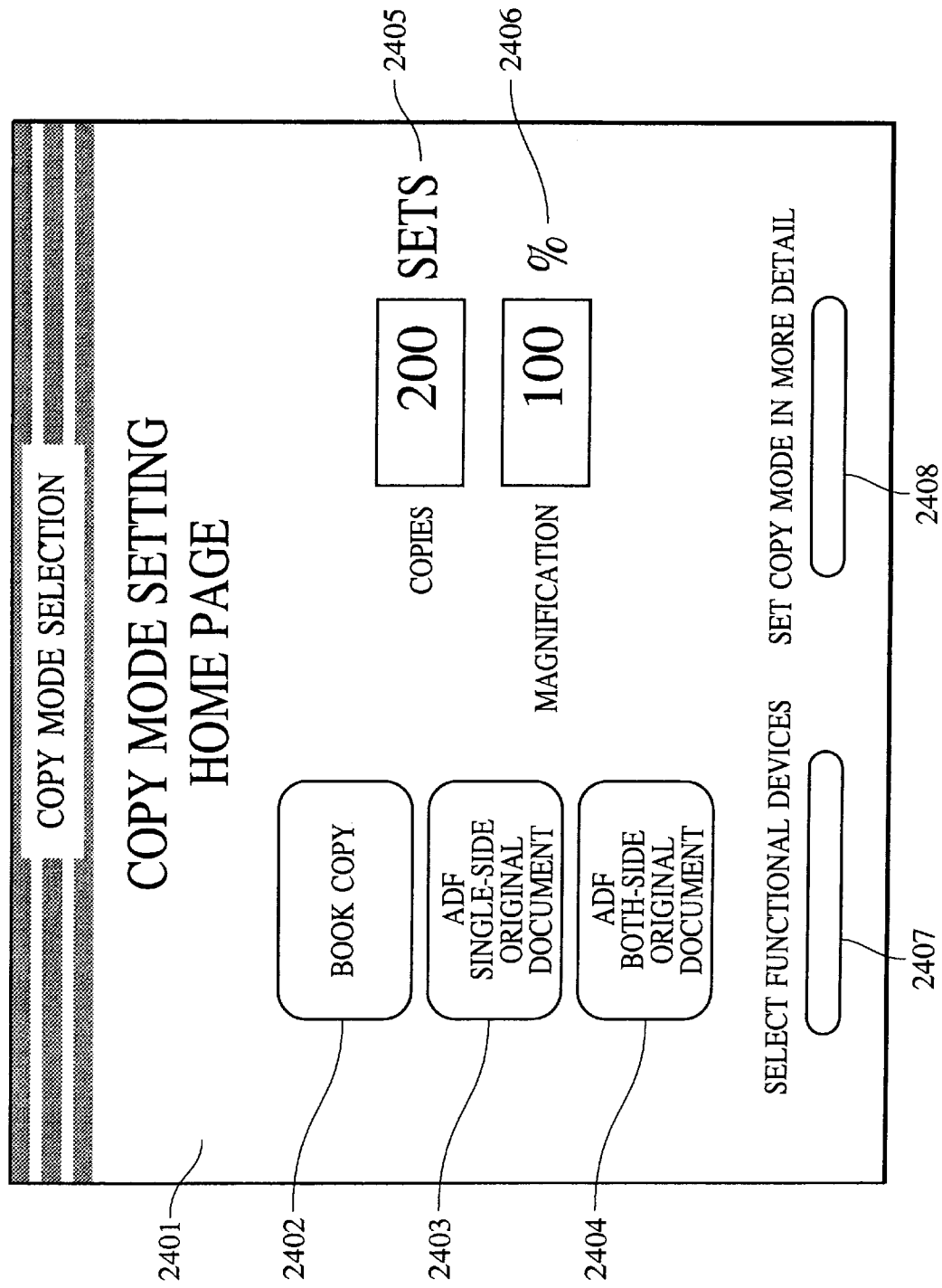
FIG. 24 is a schematic diagram illustrating the operating screen of the operating portion of the image processing apparatus illustrated in FIG. 1.

A basic configuration of the OCU 53 has been described above. FIG. 24 shows a display, a selection menu and settings on the display unit. In FIG. 24, numeral 2401 denotes a standard menu screen in the CRT screen 2301. Numeral 2402 denotes a selection area for a book mode (in which a document sheet a set on the platen and it is read by scanning the optical system), numeral 2403 denotes a selection area for a one-side copy mode of the moving read image read, numeral 2404 denotes a selection area for a dual-side copy mode of the moving read image read, numeral 2405 denotes a selection area for a number of copies, numeral 2406 denotes a selection area for a copy magnification factor, numeral 2407 denotes a selection area for function devices of the copying machine (sheet feed stacker, stapler, saddle switcher, group binder, mail box sorter, etc.) and numeral 2408 denotes a selection area for detail copy mode when detailed setting is to be conducted in the copy mode.

Figure 25:
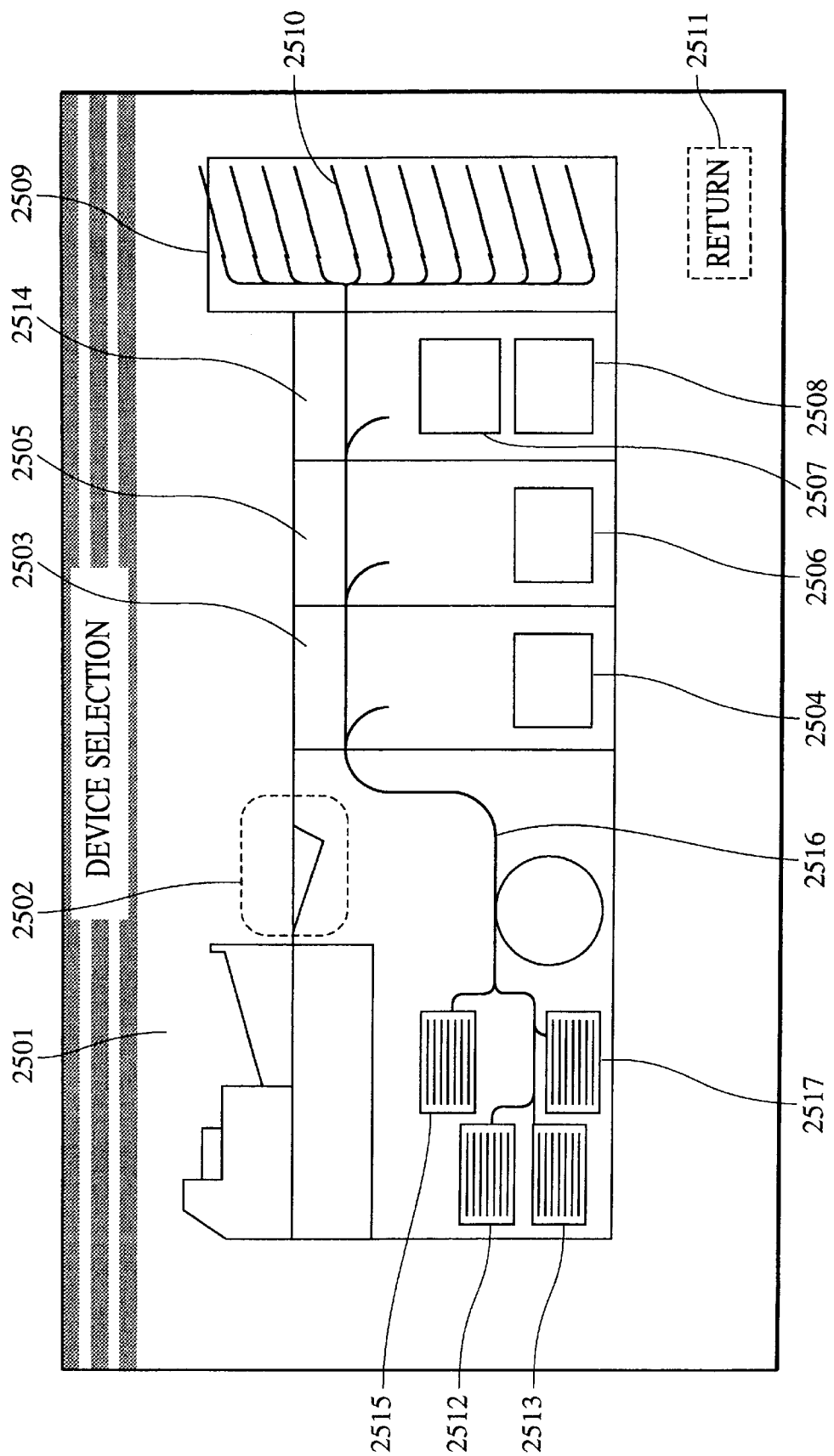
FIG. 25 is a schematic diagram illustrating the operating screen of the operating portion of the image processing apparatus illustrated in FIG. 1.

FIG. 25 shows a display status when a device select is selected by the selection area 2407 for selecting the function device. In FIG. 25, numeral 2501 denotes a screen. The copying machine and all accessories of the copying machine are displayed to permit the selection of any function. In FIG. 25, numeral 2502 denotes a proof tray to which a test printed sheet on which the image after the copying is printed to test the finishing is ejected, numeral 2503 denotes a stapler, numeral 2504 denotes a stacker for accommodating the stapled output sheets, numeral 2505 denotes a saddle switcher, numeral 2506 denotes a stacker for accommodating the output sheets saddle-stitched by the saddle stitcher 2505, numeral 2514 denotes a group binder, numerals 2507 and 2508 denote a stacker for books processed by the group binder 2514, numeral 2509 denotes a mail box sorter, numeral 2510 denotes an output sort pin for sorting by the mail box sorter 2509 and numeral 2511 denotes a selection area to return to the screen 2501. Numerals 2512, 2513, 2517 and 2515 denotes sheet feed stages 1, 2, 3 and 4, respectively. The user set transfer sheets are accommodated in the sheet feed stages 1, 2, 3 and 4. Numeral 2516 denotes a screen area to display a flow of the feed of the output sheets to the function devices on real title basis.

Figure 26:
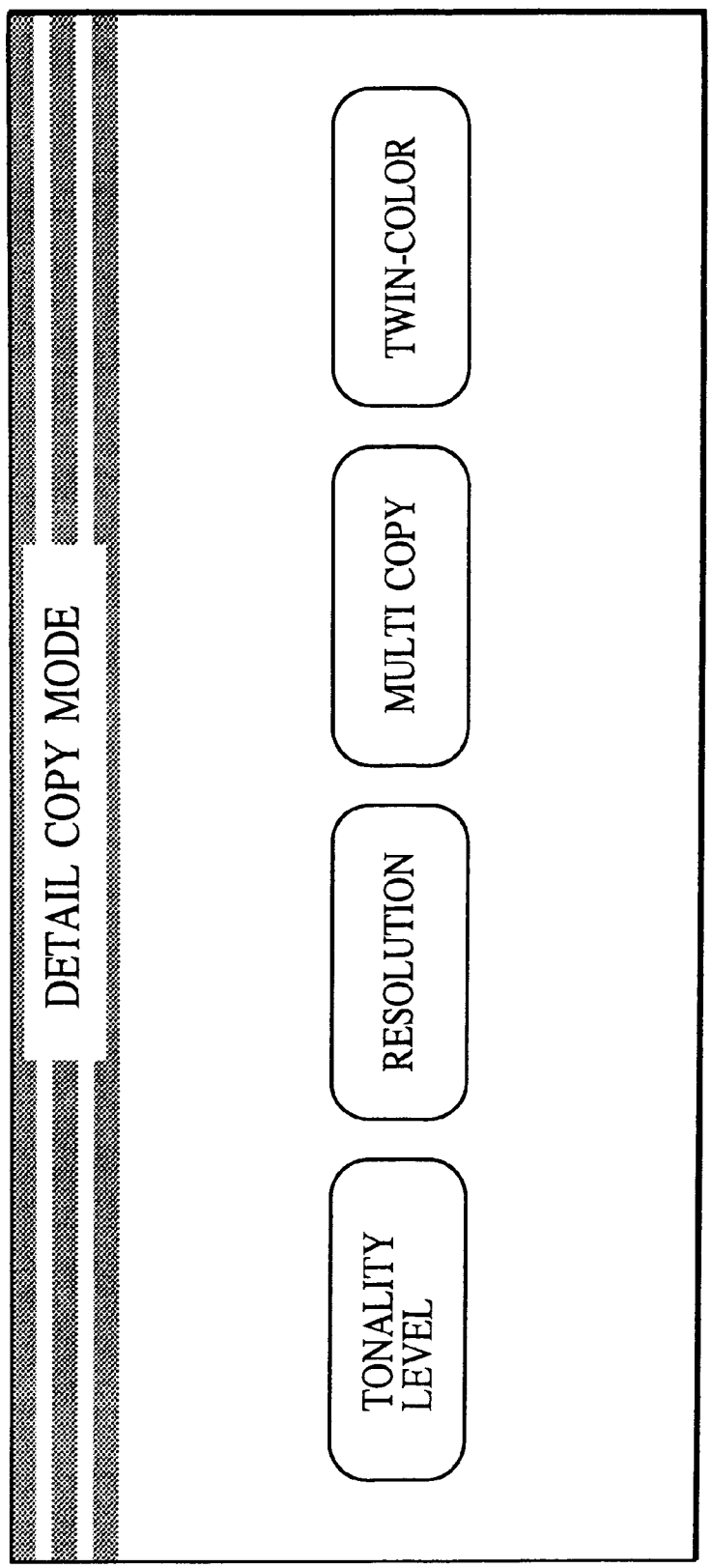
FIG. 26 is a schematic diagram illustrating the operating screen of the operating portion of the image processing apparatus illustrated in FIG. 1.

FIG. 26 shows a screen display status when a copy made detail is selected by the detail copy mode selection area 2408 of FIG. 24. The copy functions in the image processing such as the number of tones, the resolution, the multi-copying or the twin-color are selected.

Figure 27:
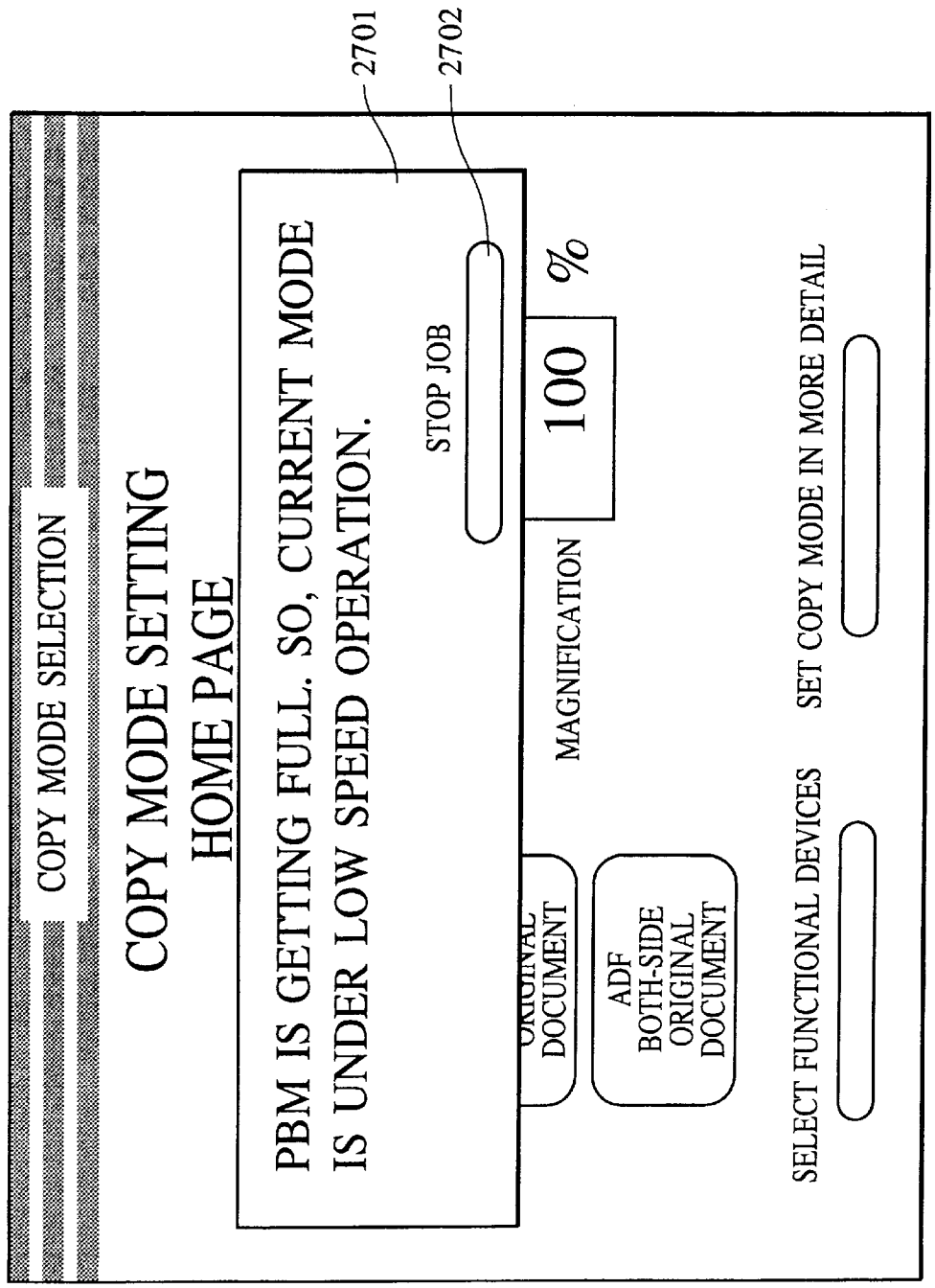
FIG. 27 is a diagram illustrating an example of the display of the operating screen of the operating portion of the image processing apparatus illustrated in FIG. 1, when in the Almost Full mode.

FIG. 27 shows a screen display status in the almost full mode. In this mode, since the image data is transferred to the PBM 65 while checking the vacant area of the PBM 65 as described above, the processing speed is low. Numeral 2701 in FIG. 27 denote display information for informing the status to the user and numeral 2702 denotes a selection area for releasing the job set by the user in that status.

Figure 28:
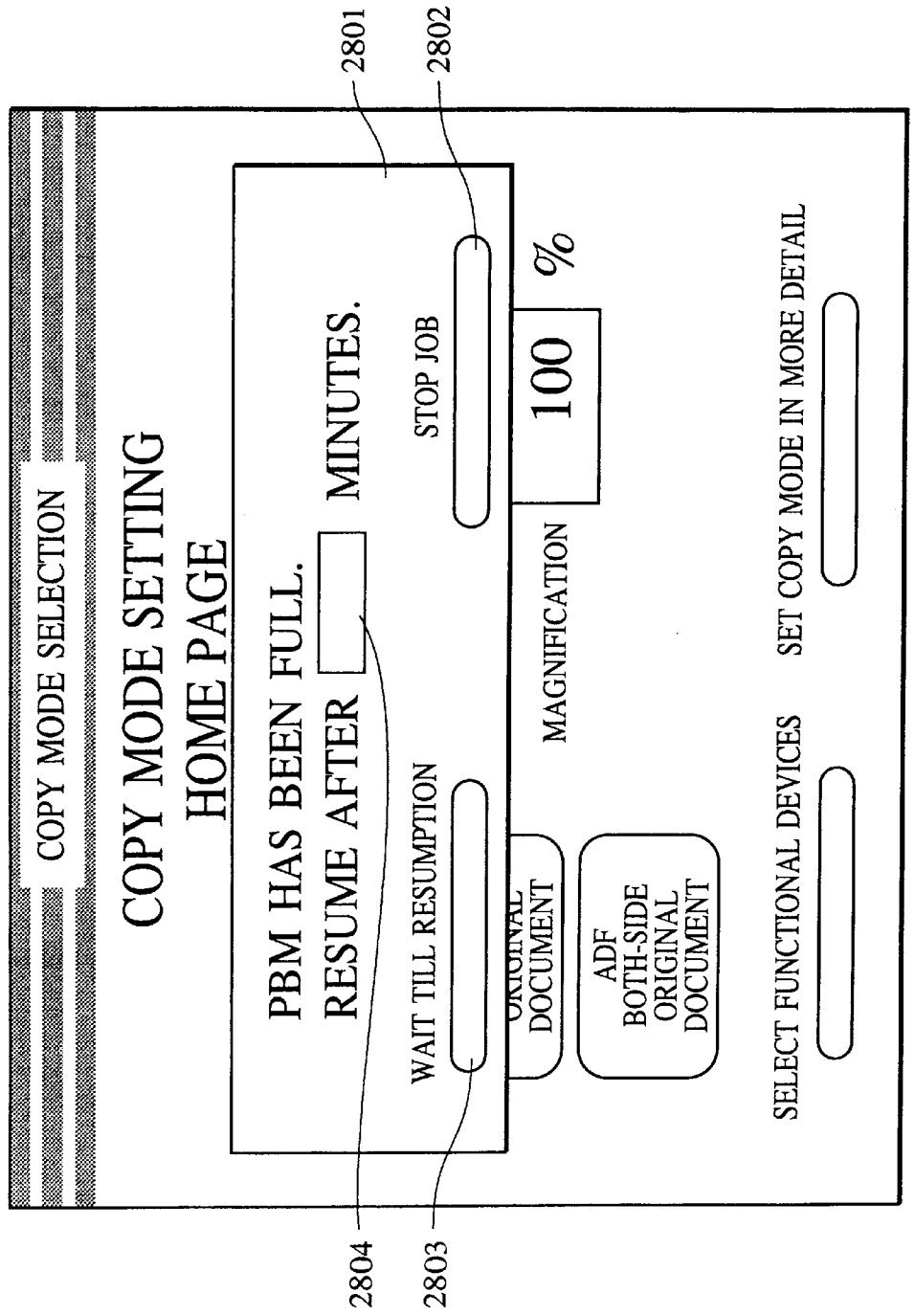
FIG. 28 is a diagram illustrating an example of the display of the operating screen of the operating portion of the image processing apparatus illustrated in FIG. 1, when in the PBM Full mode.

FIG. 28 shows a screen display status in the PBM full mode. In this mode, the image reading is temporarily stopped and the reading is withheld until the PBM full mode disappears. In FIG. 28, numeral 2801 denotes display information to inform that status, numeral 2804 denotes a display of wait time, numeral 2802 denotes a selection area for releasing the job set by the user in that status and numeral 2803 denotes a selection for waiting the start of the reading of the document sheet in the PBM full mode.

Next, the lighting sequence of the document exposure lamp (document irradiation lamp) in almost full and PBM full modes will be described.

Figure 29:
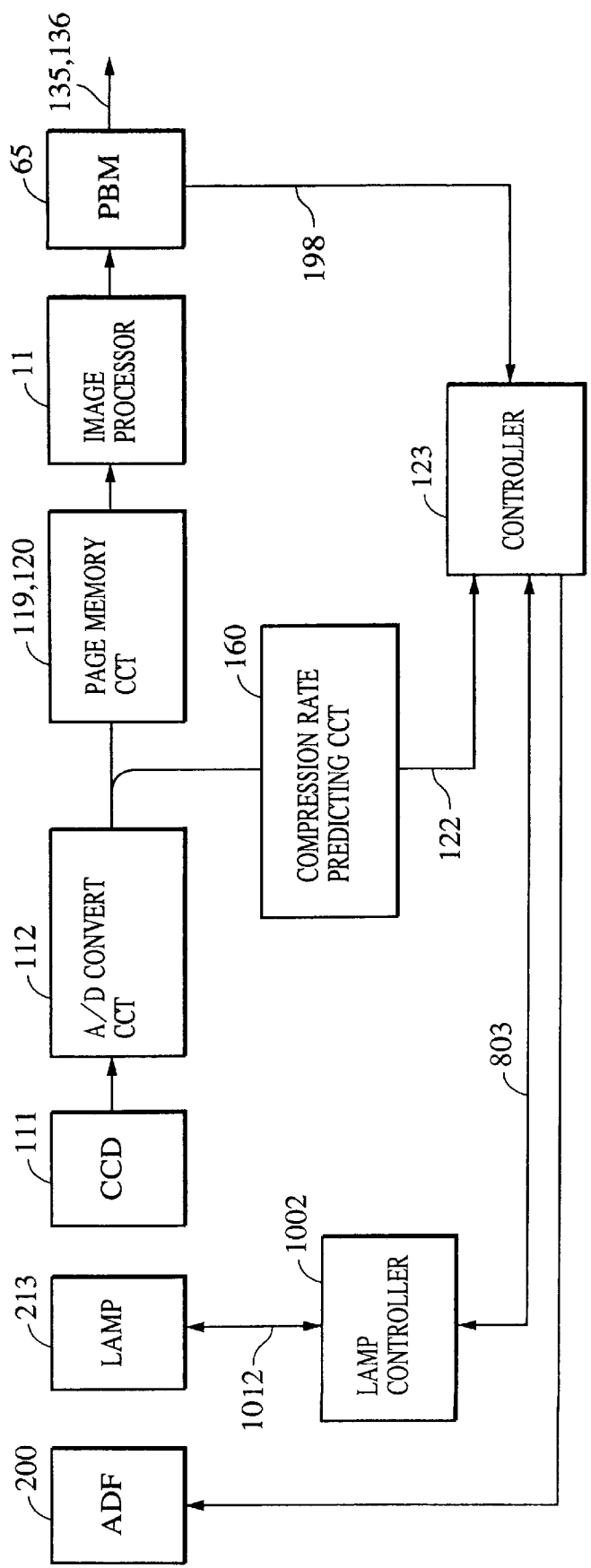
FIG. 29 is a diagram illustrating the construction of the original document irradiation lamp control portion of the image processing apparatus illustrated in FIG. 1.

FIG. 29 is block diagram for describing the document irradiation lamp of the image processing apparatus according to the present embodiment. In the figure, numeral 213 denotes a document irradiating lamp, numeral 1002 denotes a lamp control portion, which performs lighting, extinguishing, and adjusting of the document irradiation lamp. Numeral 111 denotes a CCD, numeral 112 denotes an A/D conversion circuit, numeral 160 denotes a compression prediction circuit, numeral 11 denotes an image processing portion, numeral 119 denotes a page memory, and numeral 123 denotes a controller.

In FIG. 29, the image read by the CCD 111 of the reader section 1 is subjected to conversion processing by the A/D conversion circuit 112 and then sent to the compression prediction circuit 160, wherein the conversion percentage is predicted as described above at the compression prediction circuit 160, and the prediction data is sent to the controller 123 via the signal line 122. Also, the following the predetermined processing at the image processing portion 11, the image data is stored in the PBM 65, but the remaining capacity information calculated by the remaining capacity detection circuit 157 shown in FIG. 8 is sent to the controller 123 at this time. The controller 123 controls the lamp control portion 1002 with lamp control signals 803 using a control method described later. The lamp control portion 1002 performs actual control of the document irradiation lamp 213 using the control signal 1012.

Figure 30:
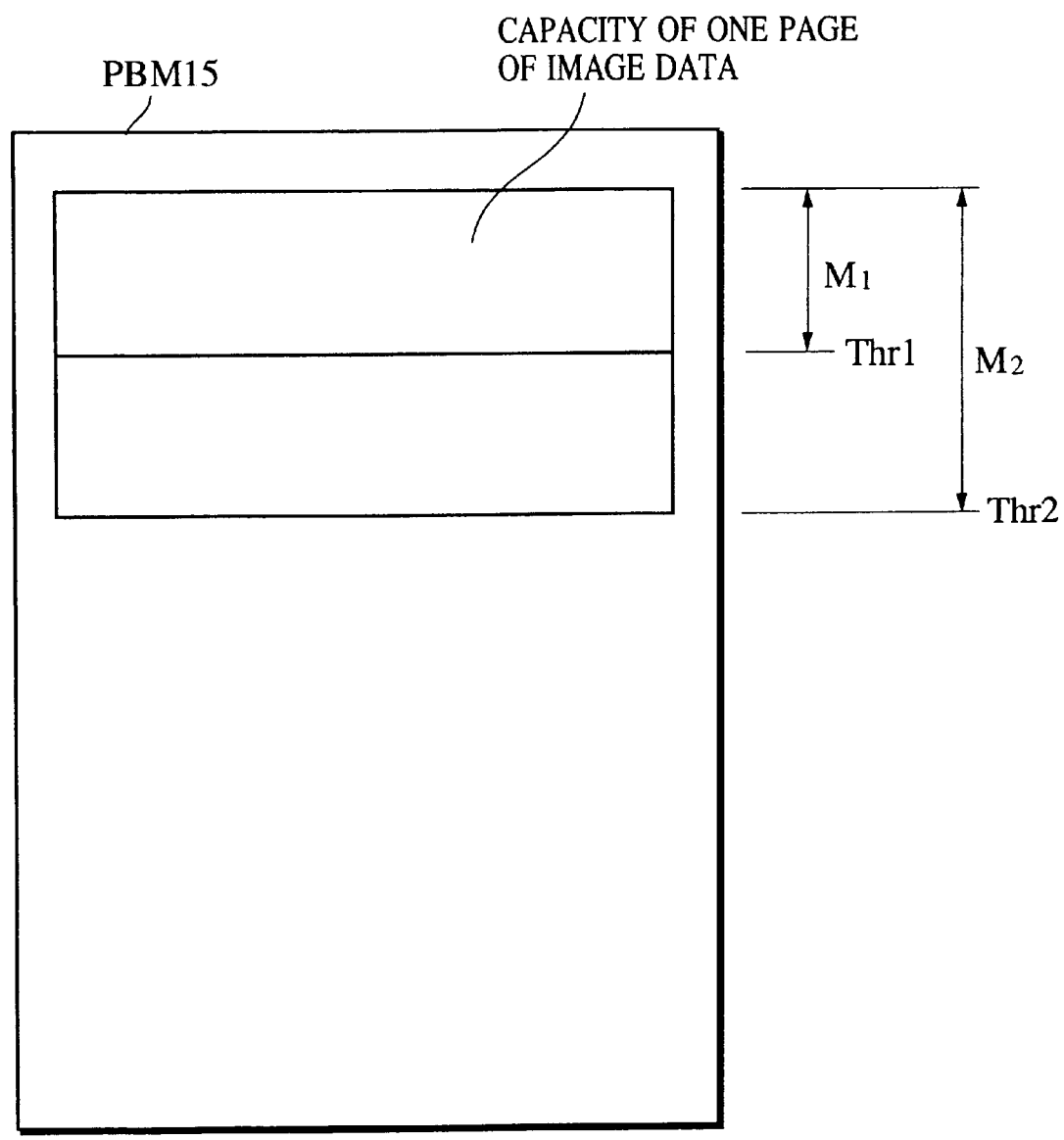
FIG. 30 is a diagram illustrating the relation between the PBM 15 of the image processing apparatus illustrated in FIG. 1 and the first and second threshold values which determine the state thereof.

FIG. 30 is a diagram representing the capacity within the PBM 65 and the almost full and PBM full states. In the Figure, M1 indicates the amount for one page worth of image data, and the value at this time is described as a first threshold value Thr1. Here, the image processing apparatus according to the present invention is in the PBM full state. Also, the second threshold value for an image capacity M2 wherein the value is greater than the Thr1 and is dependent on the precision of prediction results of the compression prediction circuit 160 and it is not known whether storage to the PBM 65 is possible or not, is described as Thr2. At this time, the image processing apparatus according to the present invention is in the almost full state.

Figure 31:
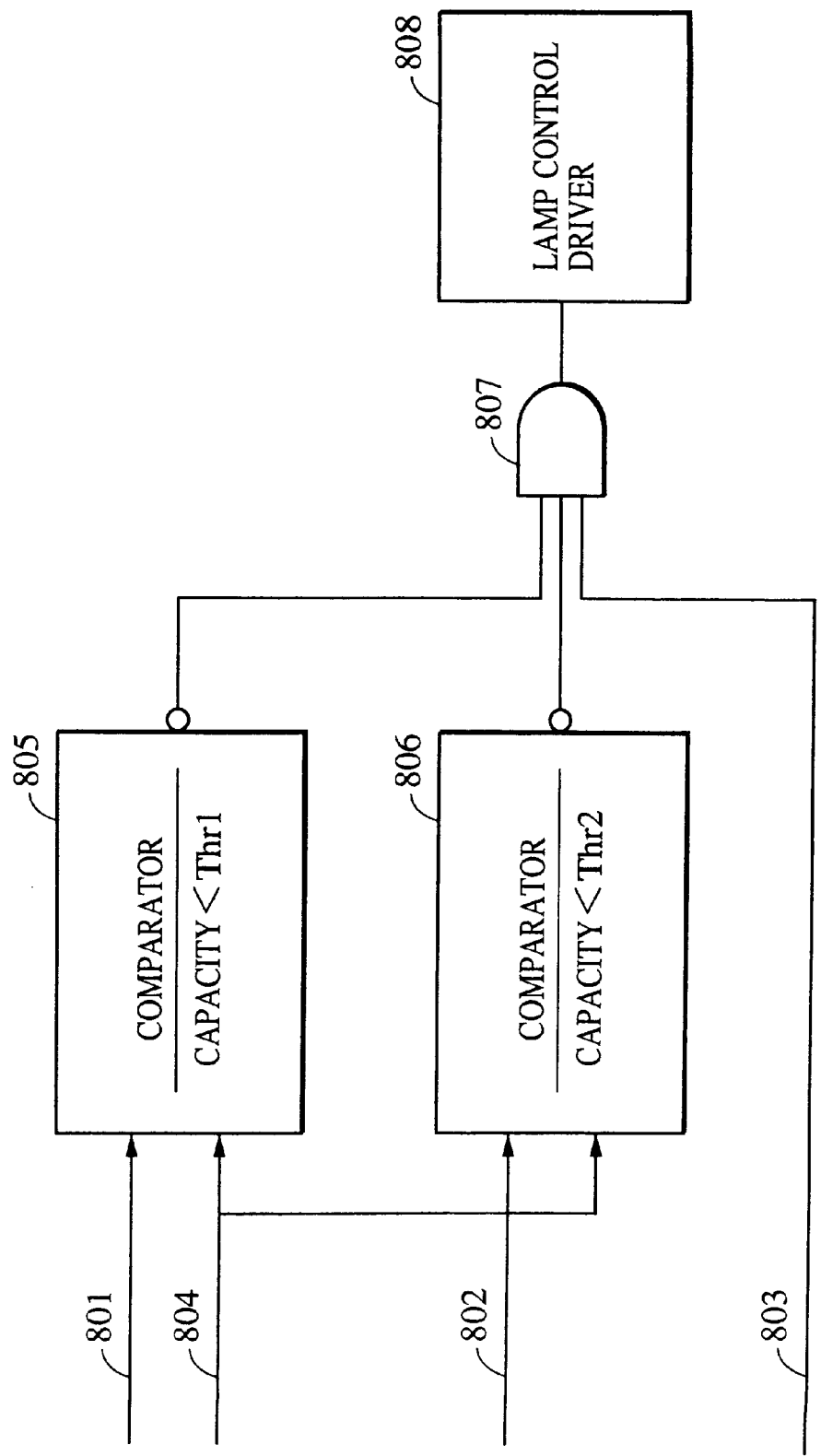
FIG. 31 is a diagram for describing the original document irradiation lamp control system of the image processing apparatus illustrated in FIG. 1.

FIG. 31 is a block diagram illustrating the construction which uses hardware circuitry to perform control of the document irradiation lamp 213 of the image processing apparatus according to the present invention. In the Figure, numeral 801 denotes a signal line which provides the first threshold value Thr1, numeral 802 denotes a signal line which provides the second threshold value Thr2, numeral 803 denotes a signal line which provides a control signal for controlling turning on and off of the document irradiation lamp 213 using the controller 123 shown in FIG. 4, and numeral 804 denotes a signal line which provides the presently remaining capacity of the PBM 65 as detected by the remaining capacity detection circuit 157. Also, numerals 805 and 806 each denote comparators, which compare the presently remaining capacity of the first threshold value Thr1 and the presently remaining capacity of the second threshold value Thr2, and in the event that the remaining capacity is greater than the threshold value, a "HIGH" signal is output. Numeral 807 denotes an AND gate, which creates signals for turning on and off of the document irradiation lamp 213, by means of taking the logical product of the signals of the signal line 803 and the comparators 805 and 806. Numeral 808 denotes a lamp control driver, and controls turning on and off of the document irradiation lamp 213 according to signals from the AND gate 807.

Figure 32:
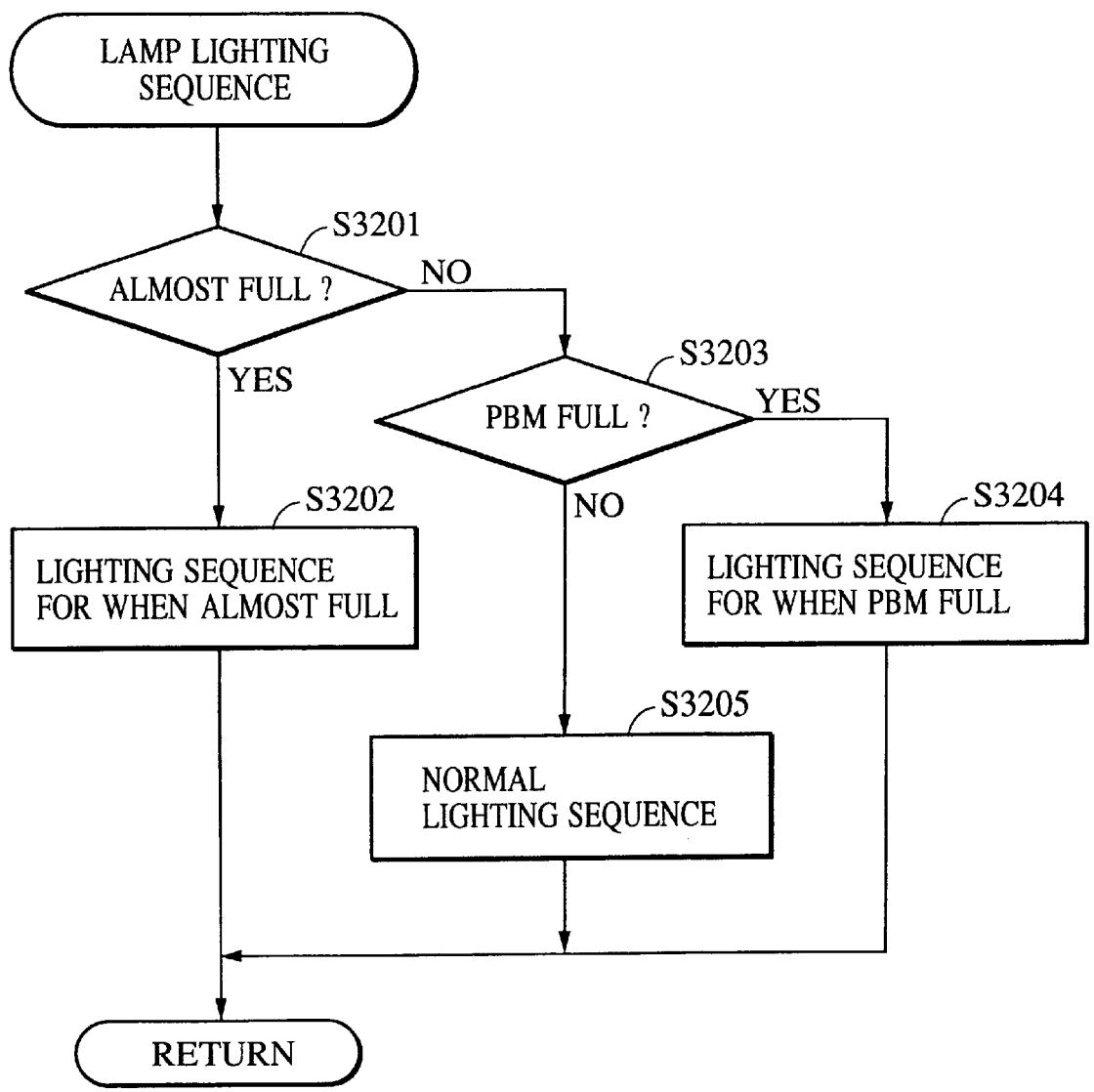
FIG. 32 is a flowchart illustrating the operation control steps of the lighting and extinguishing sequence of the original document irradiation lamp of the image processing apparatus illustrated in FIG. 1.

FIG. 32 is a diagram which illustrates control performed at the lamp control portion 1002 when such is performed by means of software, i.e., a flowchart illustrating the lighting and extinguishing sequence so as to show the operation control procedures of the lamp lighting sequences, based on judgment of what state the PBM 65 of the image processing apparatus according to the present embodiment is in. In the Figure, the controller 123 judges whether or not the PBM 65 is presently in the almost full state or not, in step S3201. If the PBM 65 is judged to be presently in the almost full state, the lighting sequence of the document irradiation lamp 213 is performed in accordance with the almost full state in step S3202. This lighting sequence will be described later.

If the PBM 65 is judged not to be presently in the almost full state, the controller 123 judges whether or not the PBM is presently in the PBM full state or not, in step S3203. If the PBM is judged to be presently in the PBM full state, the lighting sequence of the document irradiation lamp 213 is performed in accordance with the PBM full state in step S3204. This lighting sequence will be described later.

Also, in the event that the PBM is judged not to be presently in the PBM full state in the aforementioned step S3203, normal lighting sequence of the document irradiation lamp 213 is performed in step S3205, i.e., the document irradiation lamp 213 is lit continuously.

Figure 33:
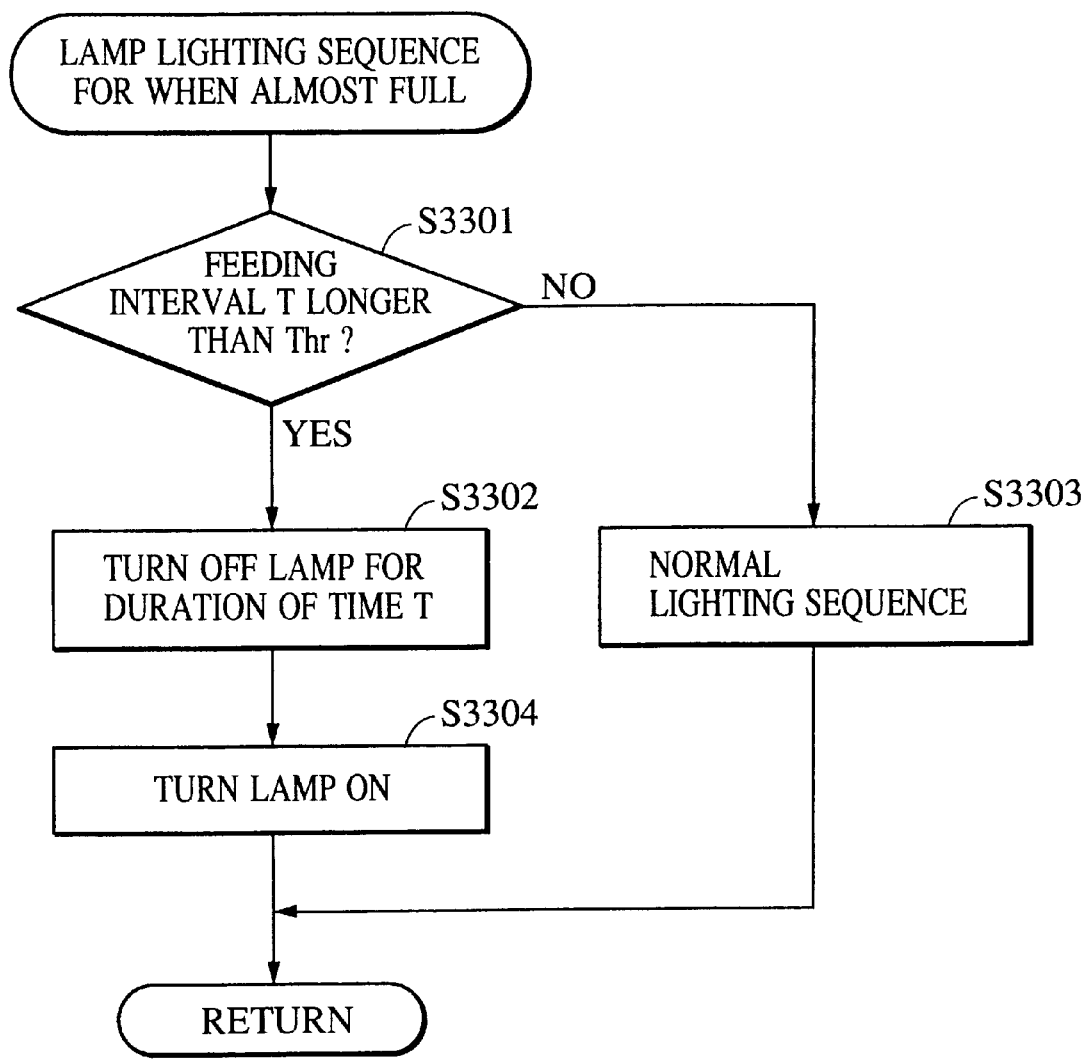
FIG. 33 is a flowchart illustrating the operation control steps of the lighting and extinguishing sequence of the original document irradiation lamp of the image processing apparatus illustrated in FIG. 1.

FIG. 33 is a flowchart illustrating the operation control procedures of the lamp lighting sequence of the document irradiation lamp 1001 performed in the almost full state in step S3202 in FIG. 32. In the Figure, the present document feeding interval time T calculated in step S3301 by the controller 123 (i.e., the time elapsing from the trailing edge of the preceding document passing over the read position to the leading edge of the next document passing over the read position) is compared with a certain predetermined threshold value Thr, and in the event that T>Thr, i.e., the present document feeding interval time T is longer than the certain threshold value Thr, then supplying of electricity to the document irradiation lamp 213 is terminated for the amount of time corresponding with the document feeding interval time T so as to turn off the lamp for that amount of time in step S3302, following which the document irradiation lamp 213 is supplied with electricity once more so as to turn it on in step S3304. Also, in the event that T<Thr in step S3301, i.e., the present document feeding interval time T is shorter than the certain threshold value Thr, lighting and extinguishing control of the lamp is not performed, and normal continuous lighting sequence of the document irradiation lamp 213 is performed in step S3303. Here, the document feeding interval time T is controlled having been calculated from the extended time of the image data of one page output from the PBM 65, and the like.

Now, the certain threshold 213 is a value which is dependent on the document irradiation lamp 213, i.e., is a value which is dependent on the amount of time required from the document irradiation lamp 213 being off to reaching the quantity of light necessary for exposing the document, i.e., in the event that the document feeding interval time T is shorter than a certain threshold value Thr, the document irradiation lamp 213 is not turned off even if in the almost full state, i.e., is continuously lit.

Figure 34:
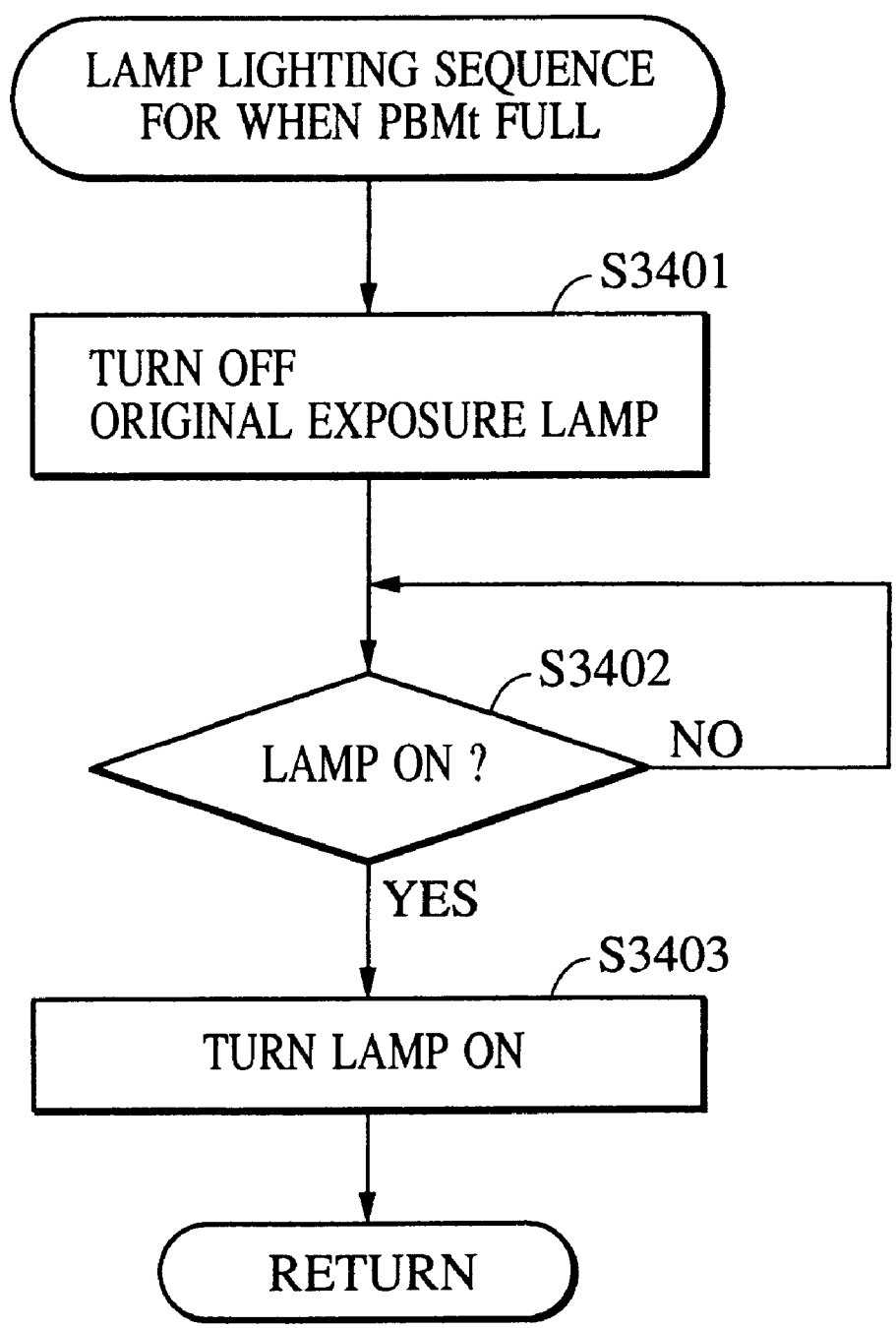
FIG. 34 is a flowchart illustrating the operation control steps of the lighting and extinguishing sequence of the original document irradiation lamp of the image processing apparatus illustrated in FIG. 1.

FIG. 34 is a flowchart illustrating the operation control procedures of the lamp lighting sequence of the document irradiation lamp 213 performed in the PBM full state in step S3204 in FIG. 32. In the PBM full state, the document feeding interval time T is longer than compared to the almost full state, so in the Figure, supplying of electricity to the document irradiation lamp 213 is terminated in step S3401. Next, in step S3402, the controller 123 judges whether the PBM full state has been resolved and an on signal of the document irradiation lamp 213 has been output. In the event that an on signal of the document irradiation lamp 213 has been output, electricity is supplied to the document irradiation lamp 213 in step S3403 once more, turning it on, in preparation for the document to be fed and read.

According to the above control, the lamp is turned off when there is no document passing through the reading portion for a certain amount of time, thus preventing overheating of the reading portion due to the lamp. Although the lamp remains on in the normal mode, the documents passing over the reading portion in succession take the heat thereof and remove it, thus inhibiting rising of temperature.

As described above, turning off the document irradiation lamp when the document feeding interval time of the document feeding means is to be long saves energy, and also prevents rising of temperature in one location due to the lamp being fixed for passing documents over and reading.

What is claimed is:

1. An original document reading apparatus, comprising:

stacking means for stacking a plurality of original documents;.

transporting means for transporting documents stacked upon said stacking means to a reading position one at time and causing said documents to pass over said reading position;

exposure means for exposing the documents passing over said reading position;

reading means for reading the image of documents transported by means of said transporting means while said documents pass over said reading position, and also for outputting image data;

a first storage means for storing image data output from said reading means, said first storage means being capable of storing at least data for one page of document;

image processing means for performing certain image processing to image data read from said first storing means;

a second storage means for storing image data subjected to image processing by said image processing means, said second storage means having a certain amount of storage capacity;

output means for outputting the image data stored in said second storage means;

a first detection means for detecting the capacity of said second storage means occupied by image data when image processing of image data stored in aid first storage means is performed by said image processing means;

a second detection means for detecting the unused capacity of said second storage means;

a first control means for performing a first control wherein documents are transported by said transporting means at a first document interval in the event that the occupying capacity detected by said first detection means is less than the unused capacity detected by said second detection means, and performing a second control wherein documents are transported by said transporting means at a second document interval which is greater than said first document interval in the event that the occupying capacity detected by said first detection means exceeds the unused capacity detected by said second detection means; and a second control means which continuously activates said exposure means under said first control, and intermittently activates said exposure means under said second control.

2. A document reading apparatus according to claim 1, wherein said first control means performs a third control of temporarily stopping document feeding of said transporting means in the event that no unused capacity is detected by said second detecting means.

3. A document reading apparatus according to claim 2, wherein said second control means deactivates said exposure means during said third control.

4. A document reading apparatus according to claim 1, wherein said image processing means is capable of performing compression processing of image data.

5. A document reading apparatus according to claim 1, wherein said output means is capable of outputting image data to an image forming apparatus which forms an image on a sheet according to the image data.

6. A document reading apparatus according to claim 1, wherein the certain storage capacity of said second storage means is greater than that of said first storage means.

7. A document reading apparatus according to claim 2, wherein said first control means switches between said first control, said second control and said third control, during the process of a series of document reading.

8. A document reading apparatus according to claim 2, wherein said first control means switches between said first, second, and third controls at the time of changing of documents.

9. An original document reading apparatus, comprising:

transporting means for transporting a document over a reading position;

exposure means for exposing the document transported over said reading position;

reading means for reading an image of the document exposed by said exposure means;

first storage means for storing an image data read by said reading means;

first control means for performing a first control wherein documents are transported by said transporting means at a first document interval in the event that a quantity of the image data to be stored is less than the unused capacity of said first storage means, and performing a second control wherein documents are transported by said transporting means at a second document interval which is greater than said first document interval in the event that the quantity of the image data to be stored exceeds the unused capacity of said first storage means; and second control means which continuously activates said exposure means under said first control, and intermittently activates said exposure means under said second control.

10. An original document reading apparatus according to claim 9, further comprising:

second storage means for temporarily storing the image data to be stored in said first storage means; and detection means for detecting a quantity of the image data in accordance with the image data stored in said second storage means.

11. An original document reading apparatus according to claim 10, further comprising compressing means for compressing the image data stored in said second storage means, wherein said detection means detects the quantity of the image data in accordance with the image data compressed by said compressing means, and said first storage means stores the image data compressed by said compressing means.

* * * * *

UNITED STATES PATENT AND TRADEMARK OFFICE
CERTIFICATE OF CORRECTION

PATENT NO.   : 5,936,223
DATED        : August 10, 1999
INVENTOR(S)  : KATSUNARI SUZUKI ET AL.

It is certified that error appears in the above-identified patent and that said Letters Patent is hereby corrected as shown below:

COLUMN 2:

Line 4, "FIG." should read --FIGS.--;
    Line 10, "constitutes" should read --constitute--;
    Line 14, "constitutes" should read --constitute--;
    Line 17, "constitutes" should read --constitute--; and
    Line 25, "constitutes" should read --constitute--;

COLUMN 9:

Line 17, "status" should read --statuses--; and
    Line 44, "stored" should read --is stored--.

COLUMN 11:

Line 47, "denotes" should read --denote--.

COLUMN 12:

Line 10, "withhold" should read --withheld--;
    Line 54, "waited." should read --awaited.--.

COLUMN 13:

Line 50, "a" (2nd occurrence) should read --is--.

COLUMN 14:

Line 12, "denotes" should read --denote--;
    Line 26, "denote" should read --denotes--; and
    Line 36, "waiting" should read --waiting for--.

UNITED STATES PATENT AND TRADEMARK OFFICE
CERTIFICATE OF CORRECTION

PATENT NO.   : 5,936,223
DATED        : August 10, 1999
INVENTOR(S)  : KATSUNARI SUZUKI ET AL.

It is certified that error appears in the above-identified patent and that said Letters Patent is hereby corrected as shown below:

COLUMN 16:

Line 64, "time" should read --a time--.

COLUMN 17:

Line 21, "aid" should read --said--.

Signed and Sealed this

Thirtieth Day of January, 2001

*Attest:*

Q. TODD DICKINSON

*Attesting Officer*      Director of Patents and Trademarks